US007565222B2

(12) United States Patent
Popelka

(10) Patent No.: US 7,565,222 B2
(45) Date of Patent: Jul. 21, 2009

(54) ECONOMICAL OPTICAL SYSTEM TO PROVIDE REASONABLE ASSURANCE OF COMPLETED VEND OR VENDIBLE ITEMS FROM VENDING MACHINES

(75) Inventor: James F. Popelka, LaVista, NE (US)

(73) Assignee: Fawn Engineering Corporation, Des Moines, IA (US)

(*) Notice: Subject to any disclaimer, the term of this patent is extended or adjusted under 35 U.S.C. 154(b) by 160 days.

(21) Appl. No.: 10/758,157

(22) Filed: Jan. 15, 2004

(65) Prior Publication Data

US 2005/0155977 A1 Jul. 21, 2005

(51) Int. Cl.
*G06F 17/00* (2006.01)

(52) U.S. Cl. ............................ 700/244; 221/2; 221/7; 221/8; 221/21; 221/75; 221/231; 221/236; 221/243

(58) Field of Classification Search ................. 700/244, 700/231, 236, 243; 221/21, 2, 7, 8, 75
See application file for complete search history.

(56) References Cited

U.S. PATENT DOCUMENTS 3,862,414 A 1/1975 Algeri
4,252,250 A * 2/1981 Toth ............................ 221/13
4,359,147 A 11/1982 Levasseur
4,402,609 A 9/1983 Fetzer
4,412,607 A 11/1983 Collins
4,634,855 A 1/1987 Friend et al.
4,712,049 A 12/1987 Houserman
4,776,487 A 10/1988 Kurosawa et al.

(Continued)

FOREIGN PATENT DOCUMENTS

DE 42 25 165 A1 2/1994

(Continued)

OTHER PUBLICATIONS

Banner, more sensors, more solutions "PVD Series Parts Verification Sensor" P/N 113230 Rev A, Jun. 2003, pp. 1-12.

(Continued)

*Primary Examiner*—Gene Crawford
*Assistant Examiner*—Timothy R Waggoner
(74) *Attorney, Agent, or Firm*—McKee, Voorhees & Sease, P.L.C.

(57) ABSTRACT

A monitor and method for reasonable confirmation of a vend from a vending machine includes a set of optical emitters positionable on one side of a dispensing area and a set of optical detectors, adapted to sense the optical energy of the emitters, positioned on an opposite side of the dispensing area. The emitters are spaced apart from each other and mounted on a supporting structure that can be installed on the one side of the dispensing area in a vending machine. The detectors similarly are spaced from one another on a supporting structure that can be installed on an opposite side of the dispensing area. A controller operates the emitters to individually turn on and off in a predetermined sequence. The controller checks for falsing of any detector during the off periods and monitors if any detector is blocked during the on periods. Upon sensed falsing or blockage, the controller generates an output signal. The output signal can be communicated to the vending machine to stop any further attempts to vend a product.

50 Claims, 13 Drawing Sheets

U.S. PATENT DOCUMENTS

| | | | | |
|---|---|---|---|---|
| 4,785,927 | A | 11/1988 | Dobbins | |
| 4,854,477 | A | 8/1989 | Kurosawa et al. | |
| 4,871,054 | A | 10/1989 | Murray | |
| 5,015,840 | A | 5/1991 | Blau | |
| RE33,668 | E * | 8/1991 | Gray | 250/221 |
| 5,111,962 | A | 5/1992 | Oden | |
| 5,113,130 | A * | 5/1992 | Balch | 324/74 |
| 5,142,159 | A | 8/1992 | Veit et al. | |
| 5,207,784 | A | 5/1993 | Schwartzendruber | |
| 5,218,196 | A | 6/1993 | Dogtul et al. | |
| 5,229,749 | A | 7/1993 | Yenglin | |
| 5,281,809 | A | 1/1994 | Anderson et al. | |
| 5,303,844 | A | 4/1994 | Muehlberger | |
| 5,346,466 | A | 9/1994 | Yerlikaya et al. | |
| 5,404,008 | A | 4/1995 | Malinowski et al. | |
| 5,625,198 | A | 4/1997 | Chigira | |
| 5,646,398 | A | 7/1997 | Sieksmeier et al. | |
| 5,660,304 | A | 8/1997 | Halsey et al. | |
| 5,884,806 | A | 3/1999 | Boyer et al. | |
| 5,927,539 | A | 7/1999 | Truitt et al. | |
| 5,969,339 | A | 10/1999 | McMurray et al. | |
| 6,002,125 | A | 12/1999 | Schubert | |
| 6,023,064 | A | 2/2000 | Burgin | |
| 6,064,921 | A | 5/2000 | Pippin et al. | |
| 6,202,888 | B1 | 3/2001 | Pollock et al. | |
| 6,384,402 | B1 | 5/2002 | Hair, III et al. | |
| 6,516,969 | B2 | 2/2003 | Tamaoki | |
| 6,604,652 | B1 | 8/2003 | Trautwein | |
| 6,640,994 | B2 | 11/2003 | Chen | |
| 6,708,079 | B2 | 3/2004 | Mason, II | |
| 6,732,014 | B2 * | 5/2004 | Whitten et al. | 700/244 |
| 6,772,906 | B2 | 8/2004 | Wittern, Jr. et al. | |
| 6,794,634 | B2 | 9/2004 | Hair, III et al. | |
| 2003/0155367 | A1 * | 8/2003 | Chen | 221/2 |

FOREIGN PATENT DOCUMENTS

| | | | |
|---|---|---|---|
| DE | 98 46 791 | A1 | 4/2000 |
| DE | 200 06 317 | U1 | 11/2000 |
| DE | 100 17 127 | A1 | 10/2001 |
| EP | 0 026230 | | 10/1980 |
| EP | 0 020 917 | A1 | 1/1981 |
| EP | 0 432 996 | A1 | 6/1991 |
| EP | 0 572 119 | A2 | 12/1993 |
| EP | 0 905 658 | B1 | 3/1999 |
| JP | 2 257386 | | 10/1990 |
| JP | 9 326075 | | 12/1997 |
| WO | 98/05010 | | 2/1998 |
| WO | 99/56255 | | 11/1999 |
| WO | 00/74009 | | 12/2000 |
| WO | 03/052706 | A1 | 6/2003 |

OTHER PUBLICATIONS

Banner Engineering Corp.—PVS Series “Bin Picking Sensors” (c) 2004 (1 pg).

Banner Engineering Corp., “LX Series Part-Sensing Light Screens” P/N 10865 Rev A (3 pgs).

Fairchild Semiconductor, “Plastic Infrared Light Emitting Diode” DS300338 Oct. 31, 2001 (2 pgs).

Hans-Hermann Truatwein SB, Patent No. DE 19846791; Pub. Apr. 13, 2000 (Abstract), p pg.

Herwig, Thomas, European Patent No. EP0020917; Pub. Jan. 7, 1981 (Abstract), 1 pg.

Kiesuke, Ogarashi; Japanese Patent No. JP 2257386; Pub. Oct. 18, 1990 (Abstract), 1 pg..

Kingbright, “Infra-Red Emitting Diodes” AP3216F-1-5, 5 pgs.

LINUX Infrared Remote Control (LIRC) “Serial Port Receivers”, www.lirc.org/receives.html (4 pgs).

LUMEX Inc., “Mini Receiver Module, Right Angle Leads”, Part No. OED-MRM791-2F, dated Jan. 3, 2003 (1 pg drawing).

OMRON Industrial Safety Machine Safeguarding Products, “Light Curtains” (c)2003 (3 pgs).

OPTEK Technology, Inc., Types OP166A, OP166B, OP166C, OP166D, Infrared Emitting Diodes—designs (1 pg).

Panasonic, Photo 1C, PNA4601M Series, “Bipolar Integrated Circuit with Photodetection Function”—Features, dated Mar. 2001 (4 pgs).

SANYO Seiki Mfg. Co. Ltd; Japanese Patent No. JP 10265028; Pub. Oct. 6, 1998 (Abstract) 1 pg.

Stiefel GmbH, Patent No. DE 10017127; Pub. Oct. 11, 2001 (Abstract) 1 pg.

Kit-Kat Candy Vending Machine Service Manual, Parts List, and Control Specification, Model 3087-KK, P/N 4206656, Rev C, Jan. 1998 (62 pgs).

Trans-Finanz-Service SA, Patent No. DE 4225165; Pub. Feb. 3, 1994 (Abstract) 1 pg.

Vishay telefunken “Photo Modules for PCM Remote Control Systems” Document 82085 dated Aug. 1, 2000 (p. 1-7).

PMW Circuit Controls Sensor’s, AGC, Dongjie Cheng, Allegro Microsystems, dated Mar. 29, 2001 (1 pg).

Japanese Patent No. 9326075; Pub. Dec. 16, 1997 (Abstract) 1 pg.

* cited by examiner

ECONOMICAL OPTICAL SYSTEM TO PROVIDE REASONABLE ASSURANCE OF COMPLETED VEND OR VENDIBLE ITEMS FROM VENDING MACHINES

INCORPORATION BY REFERENCE

The contents of co-pending, co-owned U.S. Pat. No. 6,772,906, and co-owned U.S. Pat. No. 6,540,102; is each incorporated by reference in its entirety.

I. BACKGROUND OF THE INVENTION

A. Field of Invention

The present invention relates to vending machines actuated by user selection after authorization by payment or credit and, in particular, to an apparatus, method, and system of providing reasonable assurance a user-selected vendible item has been vended.

B. Problems in the Art

The vending industry has proliferated and has advanced in technology. It has also expanded the types and variety of vendible items. The very essence of most vending machines is that they are stand-alone machines. They must accurately receive a user selection, confirm adequate money or credit for the selected product, and actuate components configured to automatically dispense the selected product from a secure, stored position in the vending machine.

Much work has gone into advancing the technology surrounding these steps. Highly sophisticated user selection interfaces have been developed. Highly sophisticated and flexible money receivers/changers exist that can handle not only coins, coupons, and tokens but also paper money and, in some cases, credit or debit cards. Much work has also gone into dispensing mechanisms, not only to achieve more reliability and accuracy, but to also improve use of space inside the vending machine. There have also been substantial advances in security and theft protection regarding vending machines. Again, as previously mentioned, many are stand-alone machines. Some are outside and vulnerable to vandalism or attempts at theft.

Despite the advances in the vending machine field, one area in which development is still needed is verification of an authorized vend. Even if the above-mentioned steps, such as correct receipt of user selection, correct authorization of money or credit, and correct instruction to dispense the selected product, are achieved by a vending machine, there are times when the vendible product does not reach the place the user is allowed access to retrieve it (the "dispensing area" inside the machine).

For example, a selected item can get hung up or jammed between its dispensing mechanism and the user-accessible dispensing area. Sometimes the machine correctly runs the correct dispensing mechanism but there is no product in line to dispense (e.g. because of mis-loading). There can also be malfunctions in the dispensing devices.

Some of these issues are described in more detail in U.S. Pat. No. 6,772,906, incorporated by reference herein. These issues are well-known in the art. If a vending machines could vend, customer satisfaction would increase. It would likely decrease instances of vandalism by disgruntled customers. It could also improve inventory/accounting data collection, which can be useful for the owners of the machines or the manufacturers of the vendible items.

Other factors come into play. Any type of vend sensor or vend confirmation system must be practical and cost-effective.

A wide variety of sensors or detection devices are available commercially for detecting the passage or proximity of an item regardless of application. Such sensors or detection devices are found in applications ranging from production lines to home security. Some utilize optical components. Some are pressure sensitive. Still others utilize some characteristic of or on the item to detect it (e.g., magnetic property, color, shape, size, weight, etc., and radio frequency identification methods (RFID)). There are also energy beam devices such as x-ray or ultrasound. However, some of these methods would not be reliable or accurate enough to be practical for vend verification, especially for a range of shapes, sizes, weights, and types of vendible products. Some of these methods are too complex or expensive to justify in vending machines. Some are not robust enough for vending machine environments. And some are likely ineligible for vending machines (e.g. safety issues with x-rays).

In the past there have been attempts to try to verify a vend by sensing passage towards or arrival at the dispensing area using one of these types of sensing methods. For example, several attempts use a single optical beam across the product path to the dispensing area. If a can or bottle is actually dispensed and passes the beam, interruption of the beam is sensed and is used to confirm the vend.

Single beam optical sensors can work fairly well for machines that are limited to a standard sized, relatively large items, and which have a well-defined product path to the dispensing area. Examples would be twelve or sixteen ounce beverage cans or bottles. The delivery path from the dispensing mechanism to the user accessible dispensing area is usually well-defied, constant, and constrained in size. The single beam can be aligned so that there is reasonable assurance that a passing can or bottle interrupts the single beam. In such cases, a single beam (one emitter/one detector) sensor can be relatively reliable and its cost can many times be justified.

However, detection reliability by a single beam of a variety of shapes and sizes of vendible items that do not have a single, well-defined dispension path to the dispensing area is difficult. For example, candy and snack vending machines handle a variety of containers of different shapes and sizes (including non-food items). Vending machine manufacturers utilize a variety of different types of dispensing mechanisms in such machines. Most times, there are multiple dispensing mechanisms in a single vending machine. Rarely is there a single well-defined path for dispensed items to the user-accessible dispensing area.

Therefore, it is difficult to create a universal vend sensor for such varied containers and machines. And further, the relatively historically low cost of small packages of candy and snacks makes it less economically justifiable to add vend confirmation systems to such vending machines.

Additionally, not only have the variety of shapes and sizes of vendible items proliferated, but their value has increased. For example, vending machines for bottled beverages contain a variety of selections ranging from twenty ounce plastic bottles to 8 ounce glass bottles. Candy and snack type machines handle a wide variety of candies and snacks, but in increasingly varied types, sizes, and shapes of containers. They increasingly handle even non-food items such as fingernail clippers, phone cards, and postage stamps. Many of these types of products are dispensed out of a vertical matrix of rows and columns. There can be a plurality of dispensing mechanisms arranged in a plurality of rows and columns in the machine. The selected product moves out of the front of a dispensing mechanism and is allowed to free fall down to the user-accessible dispensing area. There is no constrained, single delivery path for each vended item along which a vend confirmation system could be installed.

Attempts have been made to create confirmation systems even for these types of vending machines. They tend to be positioned at or near the user-accessible dispensing area. They attempt to discern if a vendible item has been dispensed from any place in the machine.

Some such systems have as their goal to detect any item, no matter what size or shape. This includes attempts at optical solutions to try to cover every part of the dispensing area and any size vendible item. However, these systems require complex arrangements. They tend to be costly or require substantial set-up and maintenance.

For example, one attempt creates a solid plane of light energy across every part of the plane of the dispensing area. It tries to detect any attenuation of the plane of light energy which is indicative of the passage of a vendible item. The components and calibration to accomplish this tend to be expensive and complex. Another attempt closely packs together numerous optical beam emitters along one side of the dispensing area and a corresponding number of closely packed together optical beam detectors along the other side. This would attempt to simulate a solid plane of light energy across the dispensing area to try to ensure that vendible items of even a fraction of an inch in largest diameter would be detected. However, the cost, complexity, and maintenance of such a system could be impractical.

Therefore, there is still a need in the art for a method, system, or apparatus provide reasonable confirmation of a vend, with practical effectiveness and economy. There must be a balance between practical, economical considerations and desire for reasonable confirmation of a vend.

II. SUMMARY OF THE INVENTION

It is therefore a principal object, feature, aspect, or advantage of the present invention to provide an apparatus, system, and method for reasonable confirmation of a vend that improves upon the state of the art.

Further objects, features, aspects, and advantages of the present invention include an apparatus, method, system as above described which:

a. is practical.

b. is economical.

c. provides reasonable vend confirmation for a reasonable variety of types, shapes, and sizes of vendible products.

d. can be installed in a variety of vending machines.

e. is economical in power usage.

f. is durable and long lived.

g. is relatively non-complex.

h. can be installed as original equipment or retrofitted to existing equipment.

These and other objects, features, aspects, and advantages of the present invention will become more apparent with reference to the accompanying specification and claims.

For example, one aspect of the invention includes a method for reasonable confirmation of a vend. A limited number of optical emitters are spaced apart from one another on one side of the dispensing area of a vending machine. A corresponding number of spaced-apart optical detectors are placed on the other side of the dispensing area.

The emitters are turned on and off one at a time in a pre-determined order, in a continuous, repeating sequence separated by corresponding periods where no emitter is operating. The detectors are configured to have a threshold. The threshold is pre-set to indicate receipt of at least a certain intensity of optical energy of the type generated by the emitters.

The method watches for the passage of vended items by checking if all the detectors trigger each time an emitter is on, which indicates nothing has passed that blocked any detector. If any detector does not trigger during the time any emitter is on, it is assumed a blockage of the emitted optical energy has occurred because of the passage of a vendible item. An output signal is generated by the controller which can be communicated to a master controller of the vending machine, which can interpret the output signal as a confirmation of a successful vend. If all detectors trigger each time an emitter is on, the master controller can assume no vendible item has been vended.

Optionally, the method can generate an output signal if any of the detectors trigger during the times all the emitters are off. This would indicate a possible malfunction of that detector. The output signal in this circumstance can be used to prevent erroneous attempts by the master controller of the vending machine to continue attempts to vend based on a malfunctioning detector.

In this method, there is not comprehensive coverage of the dispensing area at any one time. However, by sequentially turning on emitters for relatively short amounts of time, reasonable coverage of the dispensing area is achieved. This reasonable coverage is achieved with limited power usage, cost, and complexity to provide a practical, economical, reasonable confirmation of vend. It also can allow for continuous checking of operation of the detectors.

In another aspect of the invention, an apparatus includes a first support member or structure upon which are mounted a set of a limited number of emitters spaced apart from one another, and a second support member or structure upon which are mounted a set of a limited number of detectors spaced apart from another. A microprocessor or controller is operatively connected to the emitters and detectors. It controls an on/off sequence for the emitters, as well as generates an output or error signal if any of the detectors do not trigger during the on-time of any emitter. The error signal is adapted to be in a form that could be sent to another intelligent device, for example, the master controller board of the vending machine, to provide assumed confirmation of vend to the vending machine. The apparatus could be installed as original equipment into a vending machine or retrofitted into existing vending machines by placing the first and second support members on opposite sides of a dispensing area. The microprocessor can also generate an error signal if any of the detectors trigger during the off-time of the emitters, because it indicates a malfunction of a detector.

III. BRIEF DESCRIPTION OF THE DRAWINGS

FIG. 1 is a simplified perspective view of a candy and snack type vending machine 1 showing multiple dispensing mechanisms and a user-accessible dispensing area 10 below those mechanisms, and illustrating diagrammatically placement of emitter and detector support members, here printed circuit boards 20 and 26, according to an exemplary embodiment of the present invention.

FIG. 2A is an enlarged cross-sectional view taken generally along line 2-2 of FIG. 1, looking from above at emitter board 20 and detector board 26 relative to the vending machine dispensing area 10. FIG. 2A also illustrates diagrammatically the beam pattern of one emitter relative the detectors.

IV. DETAILED DESCRIPTION OF AN EXEMPLARY EMBODIMENT OF THE INVENTION

A. Overview

Figure 1:
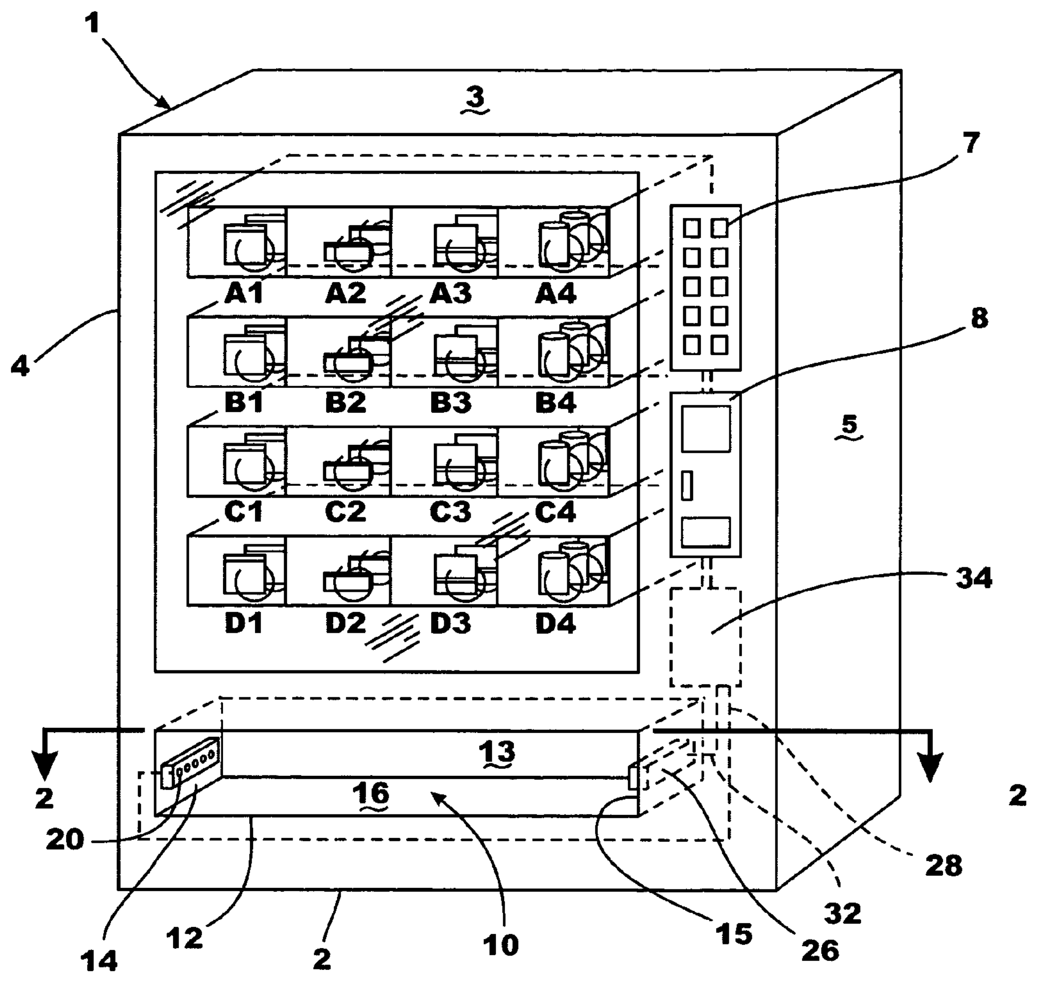

For a more complete understanding of the invention, one exemplary form it can take will now be described in detail. Frequent reference will be made to the drawings. Reference numerals and letters will be used to indicate certain parts and locations in the drawings. The same reference numerals and letters will be used to indicate the same parts and locations throughout the drawings, unless otherwise indicated.

B. Environment of Exemplary Embodiment

The exemplary embodiment will be described in the context of installation in a conventional snack vending machine which vends a variety of products such as candy, snacks, phone cards, personal care products, and other vendible items. A plurality of what will be called trays, at separated horizontal levels inside the machine, each have a plurality of individually controllable dispensing mechanisms. This type of configuration is well known in the art. An example of such a machine can be found at U.S. Pat. No. 6,540,102, incorporated by reference herein.

As diagrammatically illustrated in FIG. 1, each horizontal tray A, B, C, or D of machine 1, has individual dispensing mechanisms. Therefore, product selection can be made by selecting from the vertical matrix of A1 to D4 (rows A-D and columns 1-4), by selecting a tray (row A, B, C, or D), and a dispensing mechanism in that tray (e.g., selection B2 would operate the dispensing mechanism at the second column from the left in the second tray from the top.)

Figure 2A:
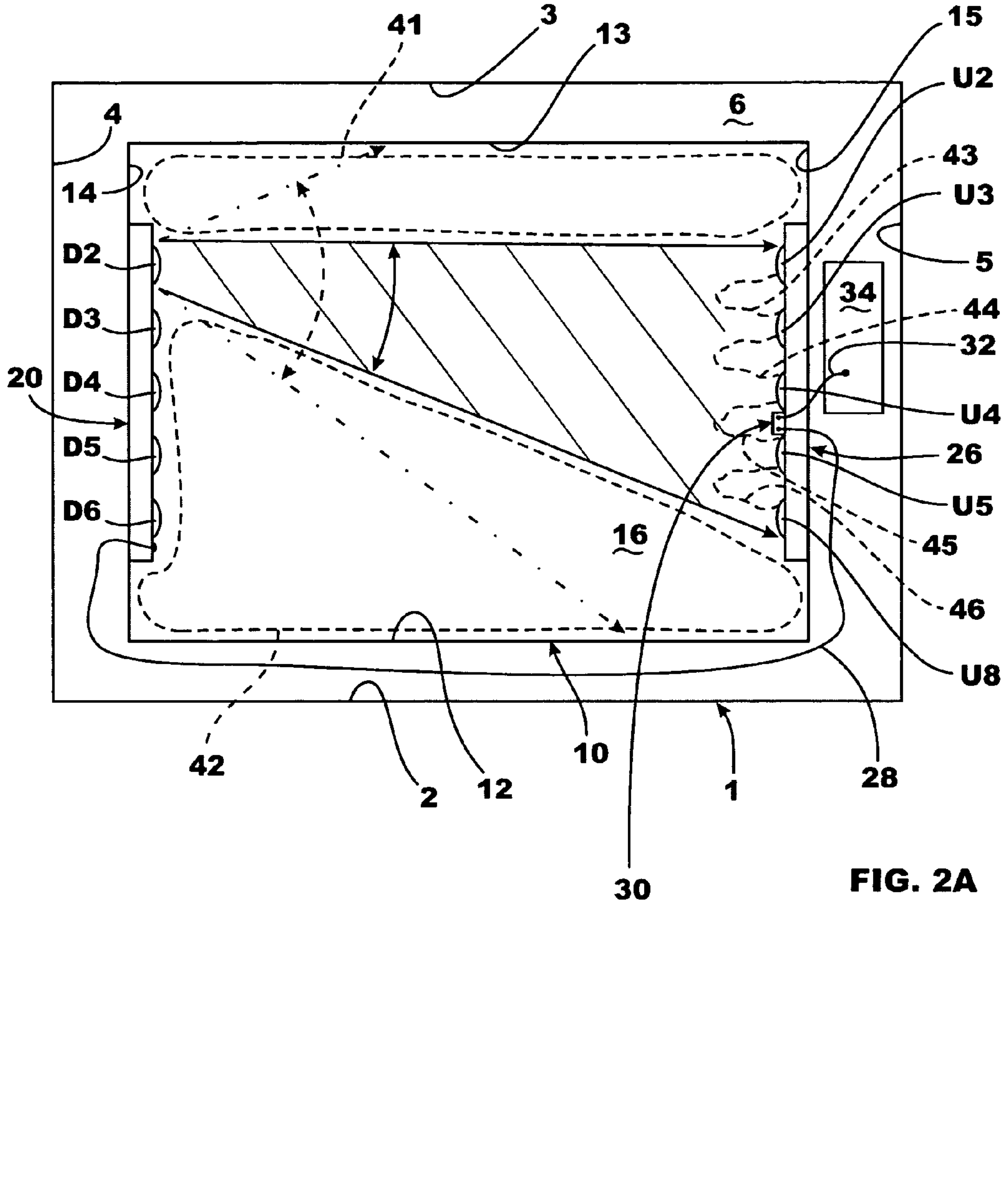
FIG. 2B is similar to FIG. 2A but shows diagrammatically operation of a second emitter.

A standard or conventional product selection module 7 and money changer/credit module 8 are associated with the machine 1 and connected to a master vending machine controller board 34 (see FIG. 2A). Controller board 34 would issue signals to the dispensing mechanism in the appropriate row and column of the appropriate tray in machine 1 upon selection and confirmation of sufficient money or credit.

FIG. 1 illustrates a user-accessible dispensing area 10 underneath a free-fall product drop zone (between the glass front of the vending machine and the dispensing ends of the columns inside the vending machine).

FIG. 2A diagrammatically illustrates a generally cross-sectional horizontal plane at or near the dispensing area of the vending machine. In the diagram, the perimeter of vending machine 1 generally includes floor 6, front 2, back 3, left side 4, and right side 5. The perimeter of dispensing area 10 (which is inside vending machine 1) is illustrated, including floor 16 defining the bottom of a drop or dispensing area for machine 1. Back, left, and right vertical walls 13, 14, and 15 enclose three sides of the dispensing area. As indicated at FIG. 1, the front of the dispensing area is not enclosed (it may have a moveable access door—not shown), as customers must be able to reach into the dispensing area. The front edge of the dispensing area is indicated by reference number 12 in FIG. 2A. It is to be understood, however, that dispensing area 10 does not have to be enclosed by walls, or even have a floor. It is intended to refer to a designated space where dispensed products from the vending machine would be directed so that a customer can access them.

The above vending machines features are well-known in the art and will not be described further.

The exemplary embodiment of the invention will also be described in the context of a vending machine having a master controller board 34 which has programming adapted to work in conjunction with the vend sensing system of the exemplary embodiment. In particular, the master controller board can include programming which tries to ensure a vend takes place in response to an authorized vend selection. This program or regimen is described in co-pending, incorporated by reference U. S. Pat. No. 6,772,906, The regimen can rely upon a vend sensor for part of its methodology. For example, the regimen can rely on a signal from a vend sensor to make an assumption about whether or not a product was dispensed. If the vend sensor does not send a signal indicative of confirmation of a successful vend, the regimen can instruct operation of another full or partial vend cycle to try to provide the customer with at least one selected product. However, it is to be understood that the regimen of U.S. Pat. No. 6,772,906 is not required for use with the present invention, and conversely, the vend sensor apparatus and method of the present invention are not required to be used with the regimen described in U.S. Pat. No. 6,772,906. The regimen of U.S. Pat. No. 6,772,906 will be used for illustration only in the example of the invention below.

C. Apparatus

A vend sensor apparatus according to an exemplary embodiment of the invention includes two separate support members or structures, here circuit boards 20 and 26 (see FIG. 1). They are configured to be installable on opposite sides of dispensing area 10 (by screws, bolts, or other connecting or mounting structure). An electrical cable 28 allows electrical communication between boards 20 and 26. A connection 32 allows electrical communication with a master controller 34 of vending machine 1.

Figure 2B:
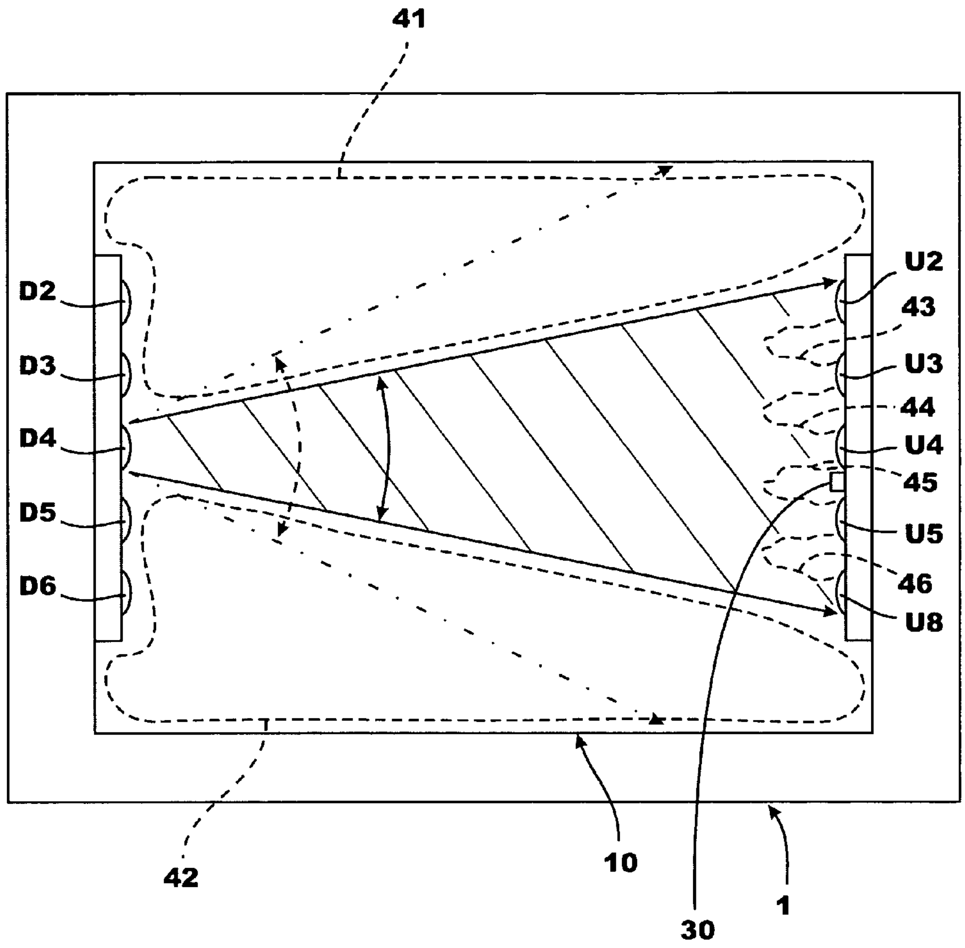

FIGS. 2A and 2B are not to scale but are intended to diagrammatically illustrate more detail of boards 20 and 26, as well as their operation as a vend sensor, which will be discussed in more detail later. The first board, sometimes called emitter board 20, includes five spaced apart infrared (IR) light emitting diodes (LEDs) D2, D3, D4, D5, and D6 (sometimes collectively referred to as emitters D). The second board, called detector board 26, has five spaced apart IR detectors U2, U3, U4, U5, and U8 (sometimes collectively referred to as detectors U).

Emitter board 20 and detector board 26 can be implemented as illustrated in FIGS. 3A-B, and 4A-F respectively. The size and configuration of boards 20 and 26 has been selected to fit many, if not most, snack-type vending machines. It can be created to mount into new machines or be retrofitted into existing machines. It includes an electrical interface that can communicate with master controller board 34 and/or other existing equipment in vending machine 1.

Boards 20 and 26, to operate correctly, must be spaced a minimum distance of 9.824 inches (250 millimeters) to a maximum distance of 34.652 inches (880 millimeters).

Surface mount components are utilized on boards 20 and 26.

1. Emitter Board

Figure 3A:
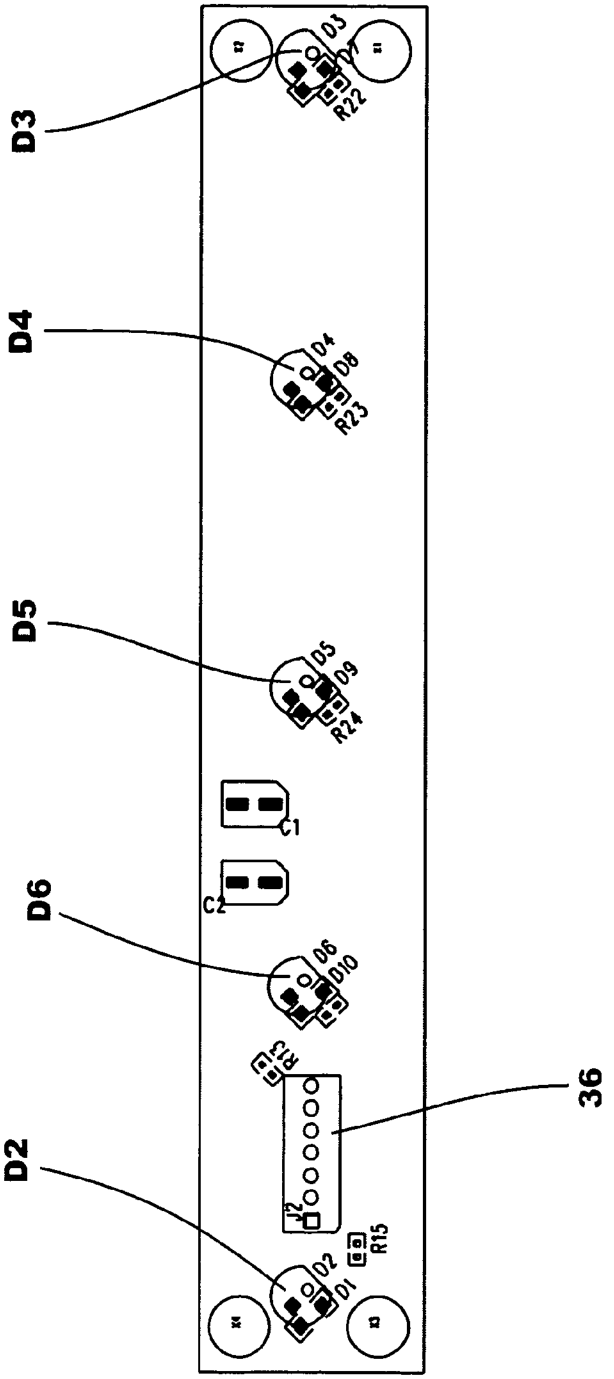
FIG. 3A is a detailed plan view of printed circuit emitter board 20 of FIG. 1.

Referring to FIG. 3A, emitter board 20 is approximately one by six inches in perimeter dimensions. The five emitters D of emitter board 20 are generally equally spaced approximately one inch apart. Emitters D are electrically connected to header 36 (also indicated by J2).

Figure 3B:
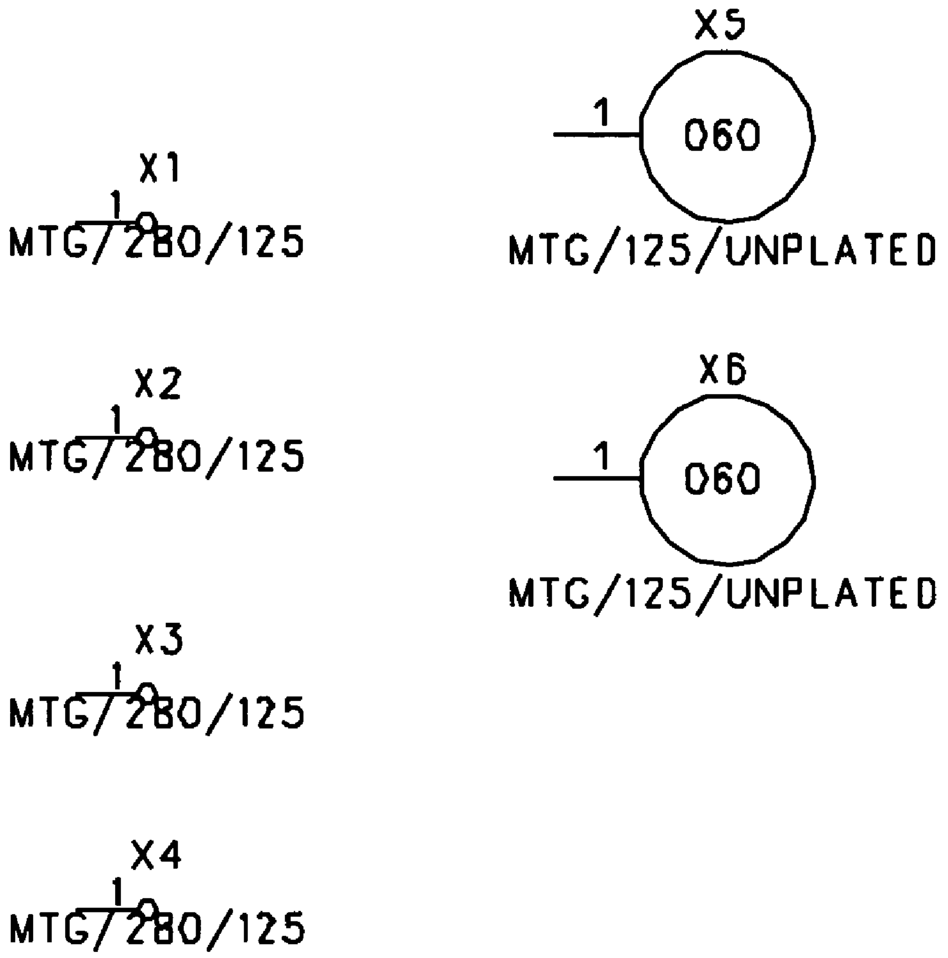
FIG. 3B is a schematic depiction of structural features, such as mounting holes and registration marks used during surface mount technology (SMT) manufacturing process for the emitter board of FIG. 3A.

The components of emitter board 20 can be predominantly surface mount technology, such as is well known. FIG. 3B schematically illustrates structures on the PCB emitter board such as mounting holes and fiducials (registration marks used during the SMT manufacturing process) that are essentially a part of the board and not the circuit. Items labeled X1-X4 represent plated mounting holes. Items X5 and X6 represent unplated mounting holes by J2 to hold the cable.

Figure 3C:
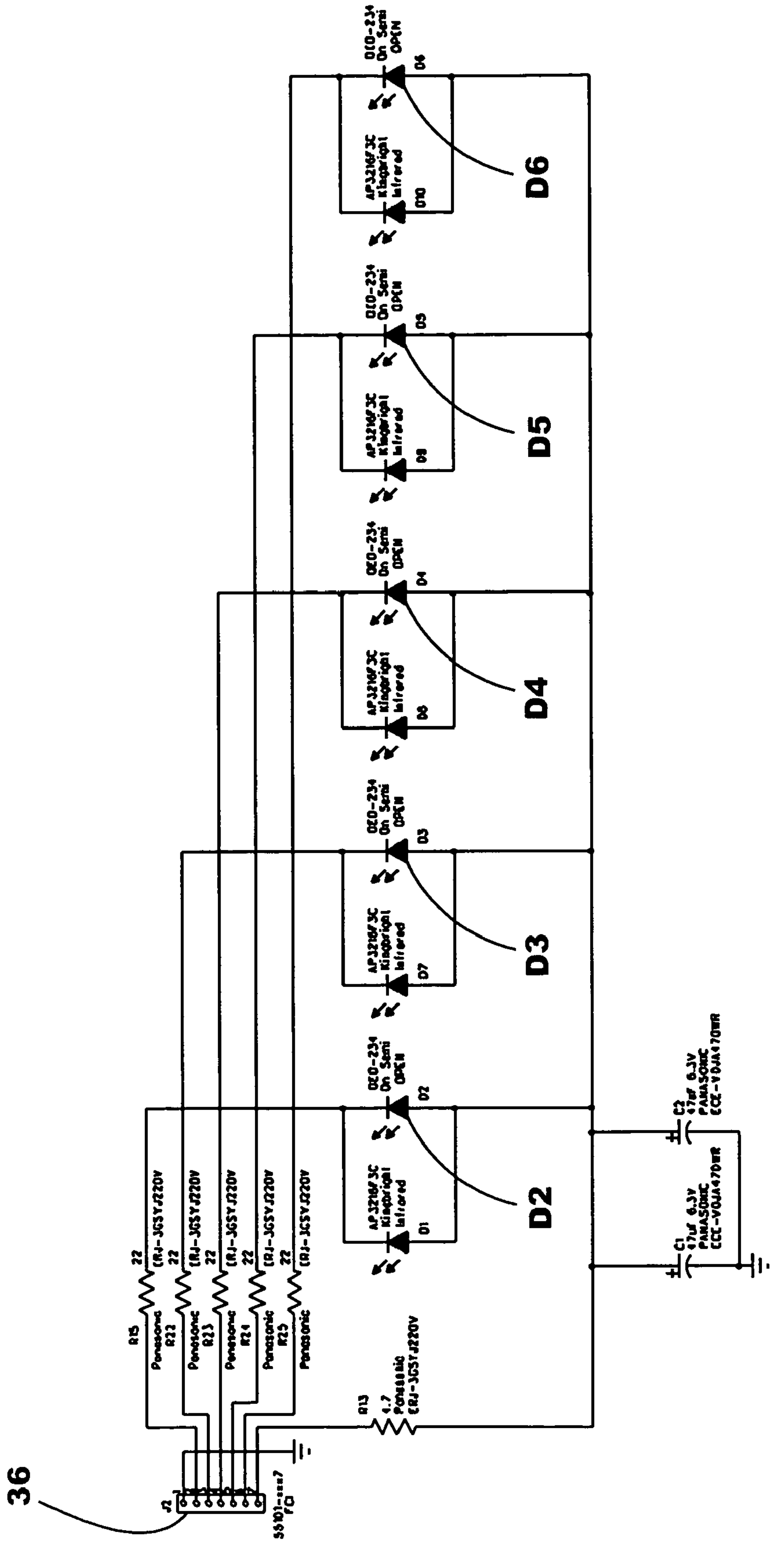
FIG. 3C is an electrical circuit diagram for the emitters of the emitter board of FIG. 3A.

FIG. 3C illustrates the electrical circuitry of emitter board 20. Seven pin header 36 (available from FCI under Part No. 55101-XXX7, 7 contact, 0.1 inches RA header) communicates to header 52 (FIG. 4A) on detector board 26 via cable 28 (FIG. 2A). This connects processor 30 to emitters D.

Details regarding the parts indicated in FIGS. 3A-3C are listed in Appendix 1 to this description.

It is to be understood that although two sets of emitters are shown in parallel (set D2, D3, D4, D5, D6 versus set D1, D7, D8, D9, D10) in FIG. 3C, only one set is needed and used. FIG. 3C is intended to illustrate two possible alternative options for the five emitters D. One option is Kingbright AP3216P3C infrared diodes (package 1206, approximately 3.2 mm by 1.6 mm SMT (Surface Mount Technology) LED, 1.1 mm thickness). Another option is Lumex OED-EL1206C140 infrared diodes (through-hole (TH) package). It is possible that circuitry could be built into board 20 to allow either set. However, only one set or the other would be installed or operated on board 20.

IR radiation from each emitter is generally directional but has some beam spread. The emitters are mounted so that they aimed generally orthogonally from the plane of board 20. Emitter beams will be modulated using an approximately 40 kilohertz square wave.

2. Detector Board

Figure 4A:
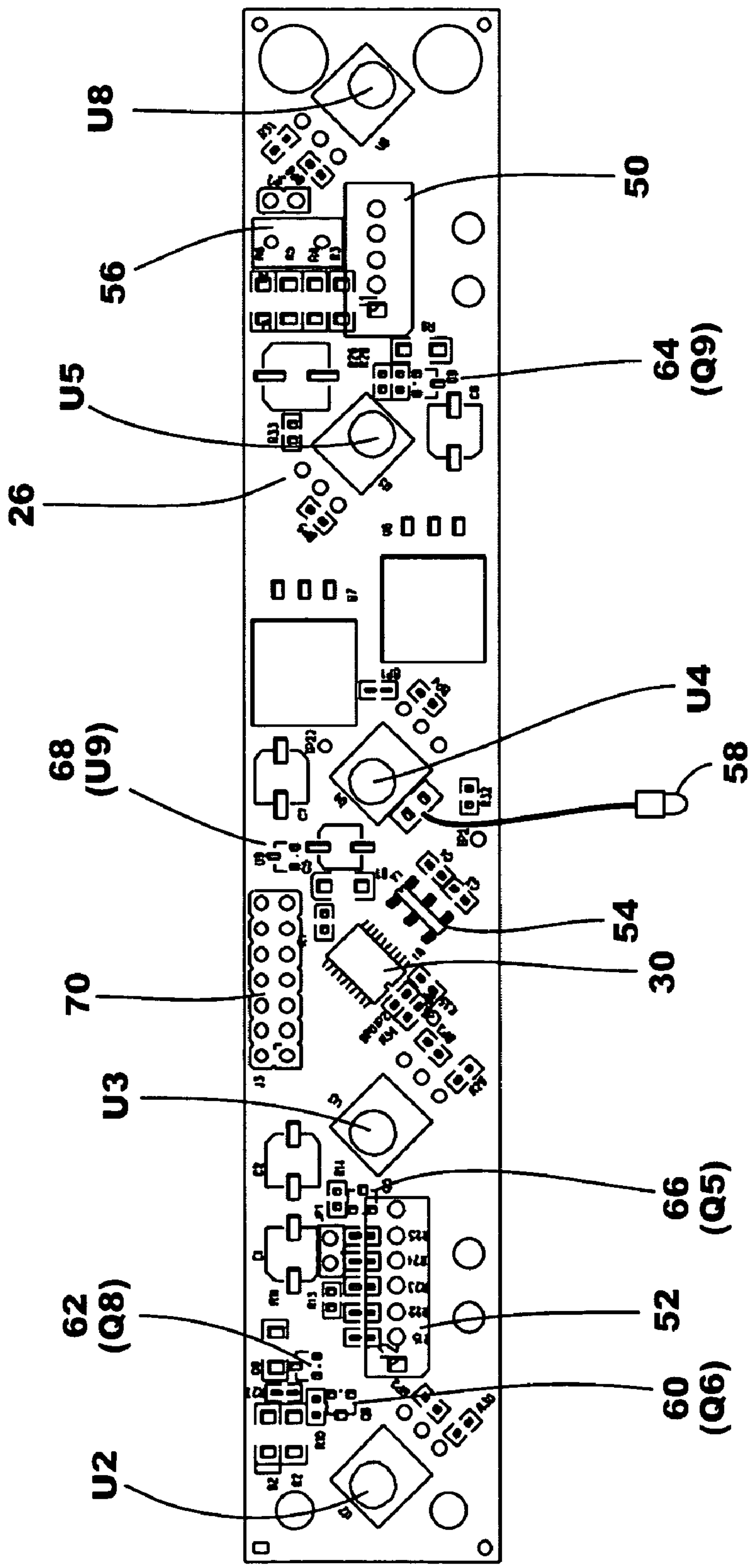
FIG. 4A is a detailed plan view of a printed circuit detector board 26 of FIG. 1.

Detector board 26 is approximately one by six inches in perimeter dimensions (see FIG. 4A. Detectors U2, U3, U4, U5, and U8 (Lumex product OED-MRM791-2F, package TH, approximately 6.8 mm by 7.76 mm by 5.5 mm in dimensions) are generally equally spaced apart about one inch (generally matching the spacing of emitters D. Detectors U are also positioned generally orthogonally to board 26.

Figure 4B:
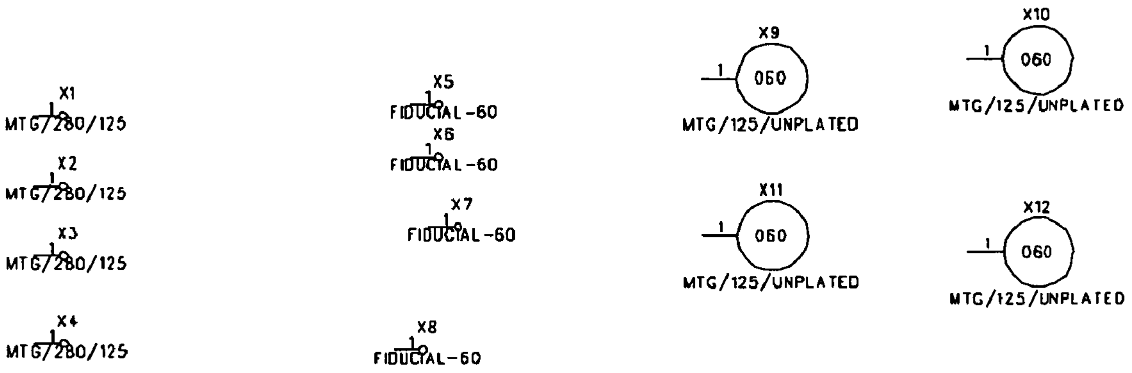
FIG. 4B is a schematic depiction of structural features, such as mounting holes and registration marks of the detector board of FIG. 4A.

FIG. 4B is a diagram for board 26 showing additional information about board 26. Similar to FIG. 3B, FIG. 4B illustrates structures such as mounting holes in fiducials on detector board 26. Items X1-X4 are mounting holes for board 26 to the vending machine. Items X5-X9 are registration marks for SMT manufacturing processes. Items X9-X12 are tie-down holes for cables.

Detector board 26 includes microprocessor 30 (Texas Instruments MSP430F1121PW CPU, SMT). FIGS. 4C-F are electrical schematics of detector board 26. They illustrate the electrical interconnections between components. Specific details for parts of detector board 26 are listed in Appendix 2. Interconnect cable details are shown in Appendix 3.

Microprocessor 30 controls a number of functions. One is on/off operation of emitters D via cable 28. Another is monitoring the output of detectors U. Another is generation of an output signal to what will be called an output stage of the detector board circuitry (see FIG. 4F), which can connected via a connection 32 from detector board 26 to a master controller board 34 for vending machine 1. The output signal from microprocessor 30 can be a signal indicative of the detection of a vended item by the vend sensor, as will be discussed later. An appropriate interface (e.g. appropriate connectors, pin-outs, and power requirements) is used to communicate with master controller board 34.

Figure 5:
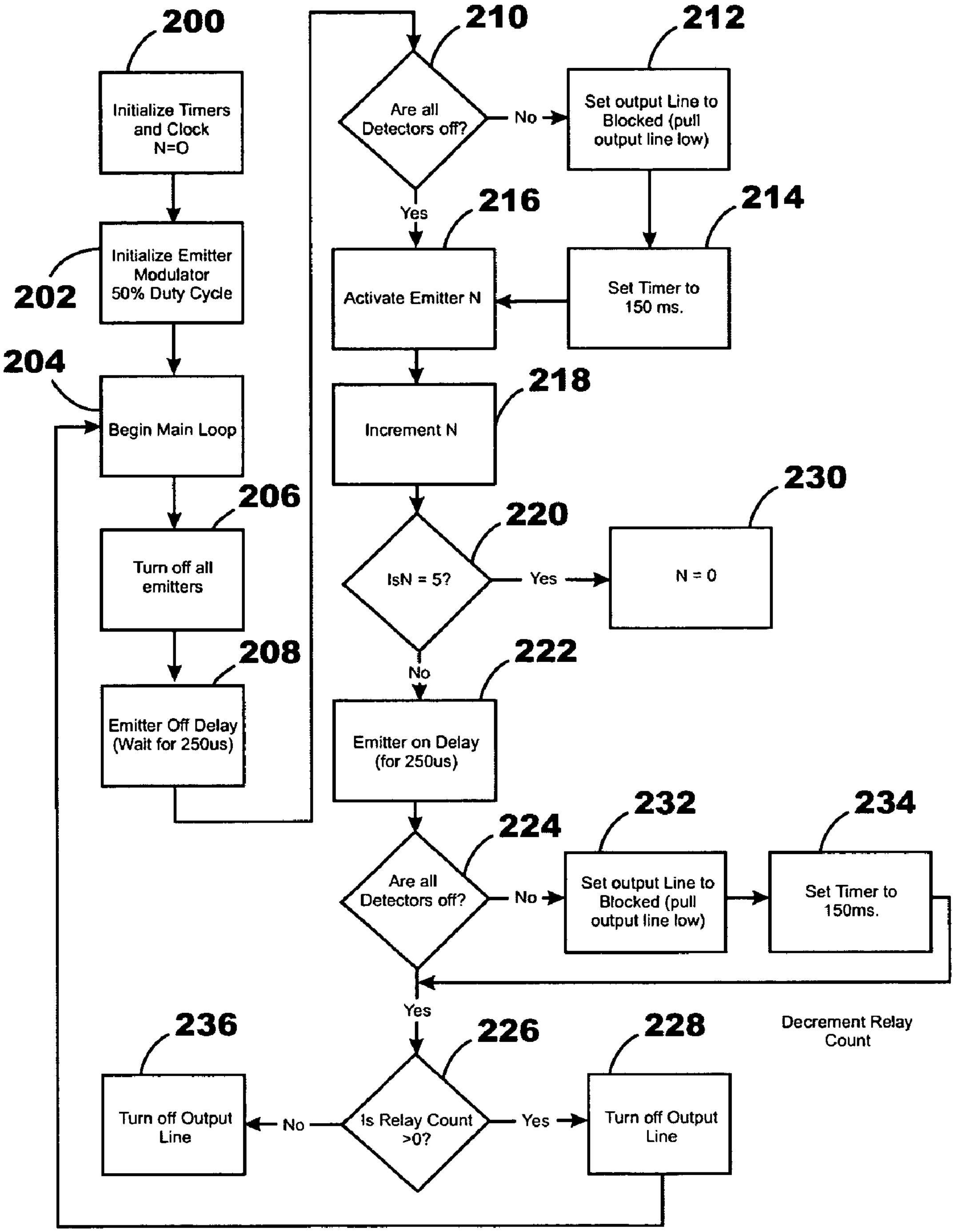
FIG. 5 is a flow chart of programming for operation of emitter and detector boards 20 and 26 of FIGS. 1-4 according to an exemplary embodiment of the present invention.

Microprocessor 30 includes FlashRom for program memory and RAM for data memory. FIG. 5 is a flow chart of the firmware code. Microprocessor 30 is programmable and debuggable through two by seven pin header 70 (also indicated at reference J2). C programming language is used to develop the firmware for microprocessor 30. Some assembly language may be needed in certain speed critical areas of the code.

Figure 4C:
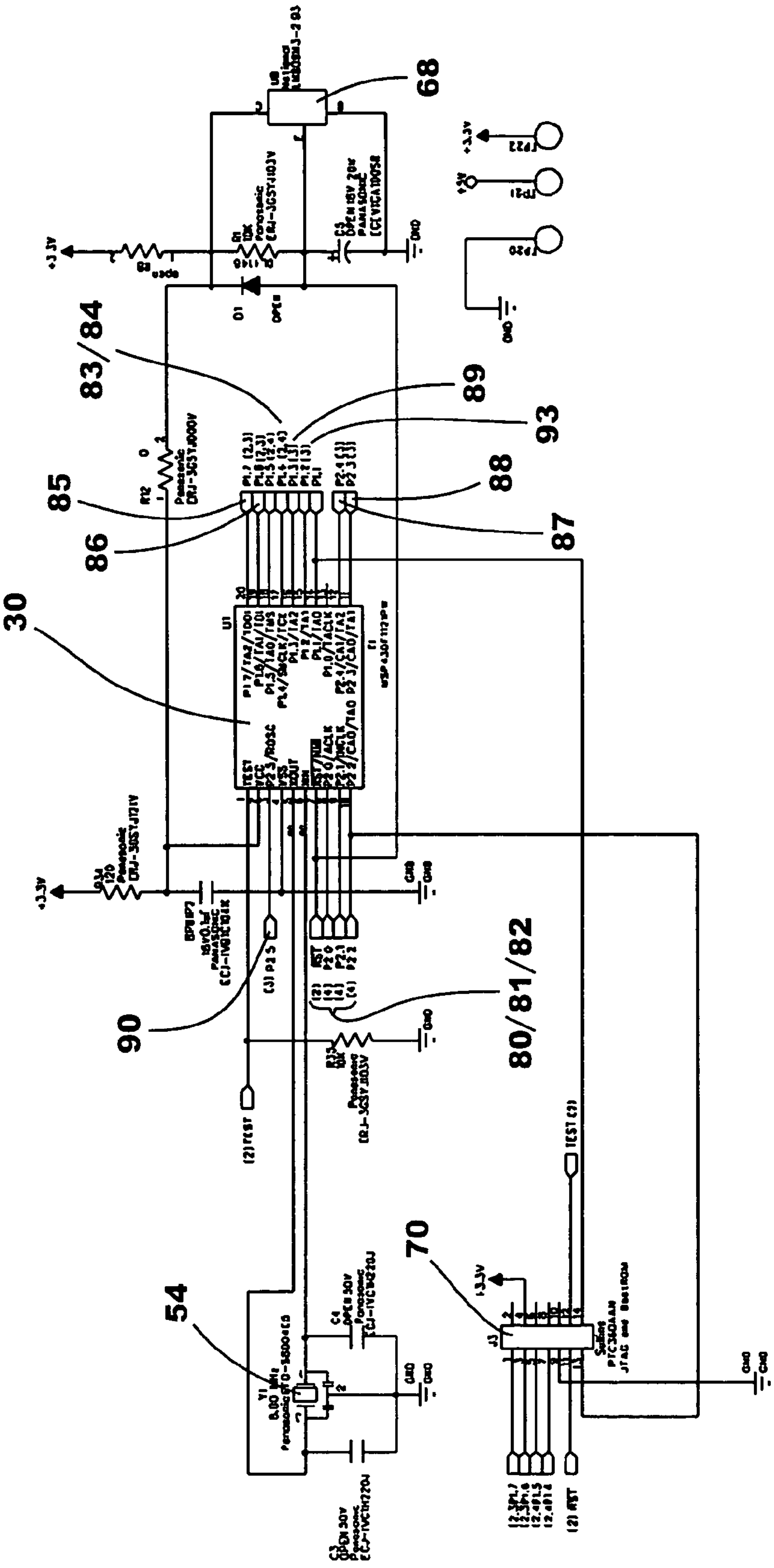
FIG. 4C is an electrical circuit diagram for the microcontroller and certain affiliated components of the detector board of FIG. 4A.
Figure 4D:
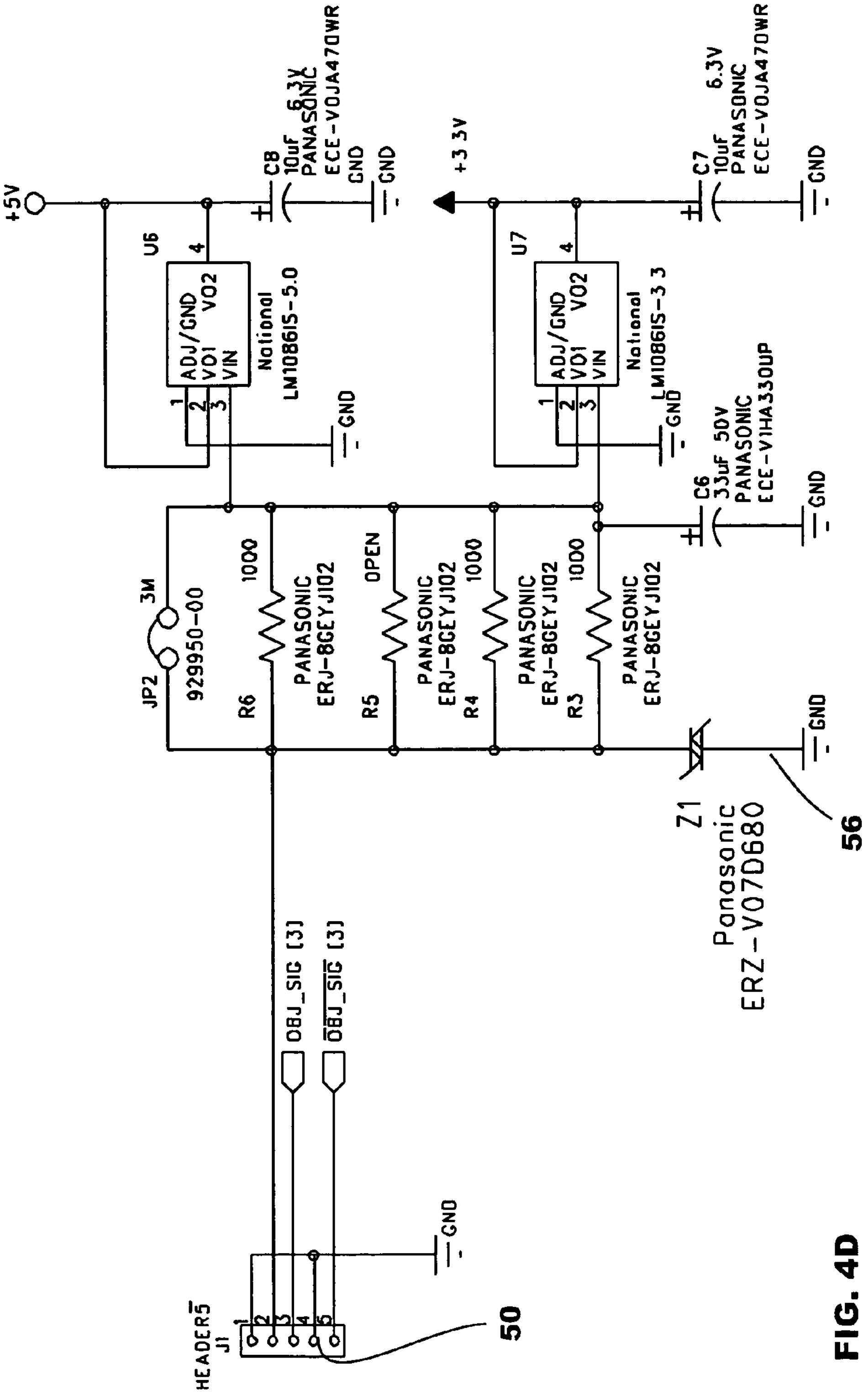
FIG. 4D is an electrical circuit diagram for a power supply circuit for the detector board of FIG. 4A.
Figure 4E:
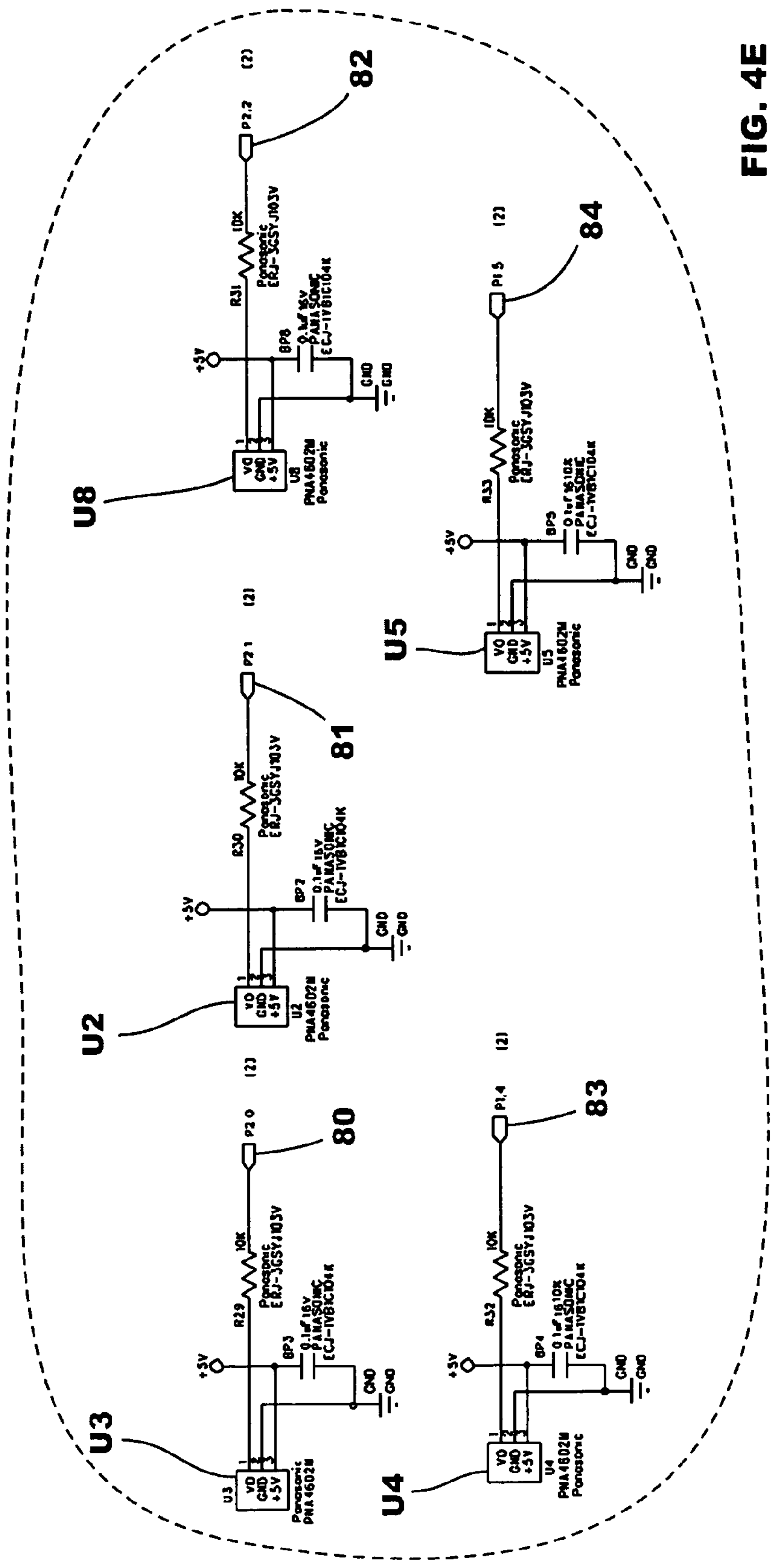
FIG. 4E are electrical circuit diagrams for infrared optical detectors on the detector board of FIG. 4A.
Figure 4F:
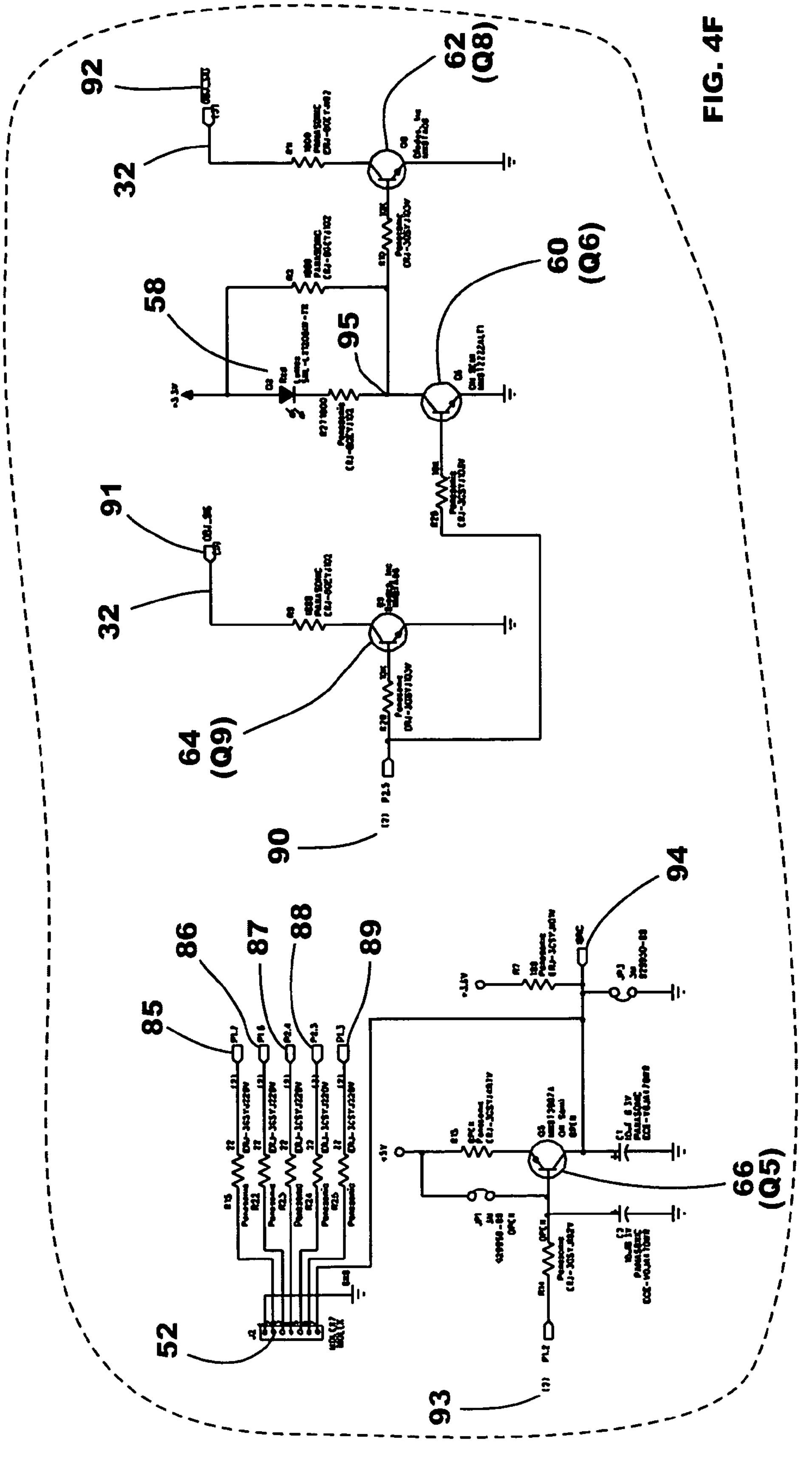
FIG. 4F are electrical circuit diagrams showing connections of the microprocessor to the emitters of FIG. 3C and an output stage of detector board 26 of FIG. 4A for communicating an output signal to a master controller board in a vending machine.

As can be seen by referring to FIGS. 3C, 4A, and 4F, cabling 28 uses plug-in connections 36 and 52 to communicate the emitters on board 24 to board 26. Specifically, emitters D are connected to ports 85, 86, 87, 88, and 89 of microprocessor 30 (See FIGS. 4C and 4F). As shown in FIG. 4C, crystal 54 provides the modulated frequency for emitters D. It can also provide a clock source for other functions.

The circuitry of board 26 uses existing supply power available at vending machine 1 (usually 15-30 volts DC). A specific power supply circuit for board 20 and 26 is shown at FIG. 4D. The power supply circuit of FIG. 4D plugs in at five pin receiver 50 on board 26 (FIG. 4A) via a matched cable/header. Low drop-out, positive voltage regulators U5 and U7 provide power levels (5.0 V and 3.3 V) to microprocessor 30, and current limiting, and thermal shut down. Transient over-voltages are absorbed by transient/surge absorber 56 (component Z1). The reset circuit associated with the three pin microprocessor reset circuit of FIG. 4C (including component U9, ref. no. 68) is a supervisory circuit that can be used to monitor the supply voltages for in microprocessor 30. It provides a reset to the microprocessor during power-up, power-down and brown-out conditions. Although shown, Jumper JP2 in FIG. 4D is not populated (is open) in this embodiment, as it is not needed.

The five detectors U are illustrated schematically at FIG. 4E. They are connected to microprocessor 30 at microprocessor inputs 80-84, as depicted in the schematic of FIG. 4C. Detectors U are configured to detect certain levels of light energy. The state of each detector U varies depending upon which side of a threshold it is detecting. Microprocessor 30 monitors which state each detector U is in.

Emitters D are powered by instruction from microprocessor 30 by controlling on/off states of transistor Q5 (FIG. 4F) via microprocessor output 93 (output P1.2, see FIGS. 4F and 4C). Both electrical power and emitter on/off instructions are communicated through cable 28 between header 52 on detector board 26 to header 36 on emitter board 20. Emitter angle is approximately 30 degrees. Pulse frequency is 38 kilohertz.

Pulsation is 250 microseconds or less. The emitters are fired in a pre-determined order, namely D2, D5, D3, D4, D6 for emitters D in FIG. 3A. Note that emitters D2 and D3 are nearest the outside edges of board 20, and thus usually nearest any walls other structures at the periphery of dispensing area 10. Each beam from emitters D is modulated to at or around 38 kilohertz (KHz) so that any ambient light or reflections do not interfere with the sensitivity or operation of the device. In other words, the light detected by detectors D1-D5 must be modulated at approximately 38 KHz in order to be detected.

Detectors U are essentially "matched" to emitters D in the sense they are configured to respond only to light energy of the wavelength of the light emitted by an emitter D. Detectors U amplify and filter any detected signal generated by the LED emitters D on the emitter bar or board 20. The amplifier contains an automatic gain control (AGC) circuit that adjusts the gain of a detector amplifier to maintain a constant signal level at the output of the amplifier. The filter contains circuitry to reject all signals except those modulated (turned on and off) at an approximately 38 kHz rate (38 kHz-40 kHz). The presence of the filter requires the LED signal to also be modulated in an on and off fashion at the 38 kHz rate. Besides the signal filtering, the detector also contains optical filtering to reject all light except for a narrow spectrum of light centered at 880 nanometers. The two types of filters allow the detectors to not be affected by stray extraneous light.

FIG. 4F also shows the output stage of the vend detect circuitry. Connection 90, output P2.5 from microprocessor 30, is the input to an open collector transistor stage (1000 ohm, 5V pull up) including transistors 64, 60, and 62.

If no output signal is sent by microprocessor 30 to output 90, indicating that nothing is blocking any detector U, transistor 64 is non-conducting. Output 91 is therefore in its "high" state. Transistor 60 would therefore also be non-conducting, and node 95 would be "high". Because node 95 is "high", transistor 62 would be conducting, and output 92 would be "low".

On the other hand, if microprocessor 30 does send an output signal to output 90, indicating a detector U has been blocked, transistor 64 becomes conducting, and output 91 is pulled "low". Transistor 60 would become conducting. Node 95 would be pulled "low" and close the gate of transistor 62, causing transistor 62 to cease being conducting. Output 92 would therefore go "high".

Therefore, outputs 91 and 92 would always be in opposite or inverted states. Either output 91 and 92 can be used by master control board 34 as a signal whether a vend has been detected. As can be appreciated, only one output 91 or 92 would be needed to inform master controller 34. However, this arrangement allows the circuitry to have available two different outputs. Different master controller boards can require different communications. Therefore, two outputs allows the vend sense circuit to be adaptable to a wider variety of master controller boards and vending machines. For example, a certain master controller board may want to see a output pulled low to indicate a vend. Another master controller board may want to see an output pulled high to indicate a vend. Thus, outputs 91 and 92 are essentially inverted from one another to provide either option.

LED 58 is mountable on detector board 26 at the location labeled D2 in FIG. 4A and, as shown in FIG. 4F, functions to indicate status of operation of the circuit. LED 58 will light so long as no output signal is generated at 90. As will be explained further, this occurs in two conditions, (a) when all detectors U are indicated to be working properly and (b) when all detectors U indicate they "see" the beam from each emitter D. LED 58 will have sufficient power to operate whenever there is no output signal at 90 (node 95 will be "high"). This feature not only provides a visual indicator of what state the vend sense circuit is in, but can also be used to correctly install emitter and detector boards 20 and 26. The circuit can be powered up and boards 20 and 26 tentatively positioned in vending machine 1. If emitters D and detectors U are properly aligned, i.e. each detector U "sees" the beam from each emitter D when they are on, LED 58 will light up. If there is misalignment, LED 58 will not light. The worker installing the boards can simply adjust the position of the boards 20 and 26 until LED 58 lights.

LED 58 will remain on until a detector U indicates attenuation of received IR energy or malfunctions. When this occurs, LED 58 will remain off until microprocessor 30 communicates the object has cleared or the malfunction has resolved.

The vend sensor circuitry is designed to operate off of 24 volts DC power at less than 200 milliamps. It interfaces to master controller board 34 by pulling low the output of the open-collector transistor buffer. The output signal will be activated for a minimum of 150 milliseconds and a maximum of 300 milliseconds after detection (e.g. set in software). The output signal will be pulled active whenever a light beam from an emitter D is blocked. The signal will reset 150 milliseconds after the blockage is removed.

As can be appreciated, there are a variety of ways for microprocessor 30 to send an output signal which can be used by a master controller board. For example, instead of controlling operation of transistor(s), microprocessor 30 could activate one or more relays, which could act as a switching device to provide a signal for use by the master control board. Other methods of creating a signal that can be used by vending machine 1 are possible. However, use of solid state transistors might make it possible to dispense with circuitry included primarily to isolate the detector circuitry from the master controller circuitry.

3. Operation

Operation of the vend sensor system of FIGS. 1-4F is according to the algorithm of FIG. 5 is as follows. Microprocessor 30 is programmed accordingly.

a. Set Up

The system is installed into the vending machine. Boards 20 and 26 should be positioned within the recommended range of distances from one another. They should also be aligned to make sure that each detector U triggers or turns on when each emitter D is turned on when nothing is between the two boards 20 and 26. The procedure previously described regarding LED 58 can be used for this purpose.

b. Initialization.

The variable N, the emitter count, is set to the value 0 (FIG. 5, step 200). During operation, variable N sequences from 1 to 5 the sequence corresponding to the five emitters D2, D3, D4, D5, and D6. Microprocessor 30 also instructs initialization of the emitter modulator (step 202) to modulate operation of each emitter when turned on. In this example, emitters D are modulated at 38 kHz. Detectors U are configured to recognize and respond only to IR energy at around 38 kHz. This helps accuracy of the system. It tends to ignore other light, including ambient light, that otherwise might cause falsing.

Various timers or clocks are initialized. These timing devices can be based on external crystal 54 or otherwise. The needed timing values will be explained below.

Part of the timing of the circuit involves what will be called a relay count. This is a software value that is initialized to 0 (zero) (can be a number assigned to a register). The relay count controls both whether, as well as the length of time, the microprocessor generates its output signal. As can be seen at steps 226, 228, and 236, so long as the relay count is 0, no output signal will be generated by microprocessor 30 (steps 226 and 236—the output line 90 is kept off or is turned off). On the other hand, so long as the relay count is above 0, the output line 90 is turned on or active by microprocessor 30.

The relay count remains 0 unless either of two conditions are sensed by the circuit, namely (a) a detector U malfunction while all emitters D are off or (b) a detector U is blocked while an emitter D is on. If either condition (a) or (b) is sensed, the value of the relay count is essentially set to correlate to the 150 ms period of either step 214 or 234. One way to set the relay count is as follows.

The cycle time of the circuit through its main loop is known (here about 500 μsec-250 μsec of all emitters off, following by 250 μsec of one emitter on). Thus, about 300 main loop cycles would take up about 150 ms (150 ms divided by 500 μsec). Thus, the relay count can be set to a value of 300 for steps 214 and 234, and the relay count decrement amount in step 228 can be set to 1. Thus, it would take 300 main loop cycles or approximately 150 ms to decrement a full relay count to zero. If either a detector malfunction is indicated during the detector check of step 210, or a product vend is detected during an emitter on-time of step 234, microprocessor 30 loads the relay count value into a register. The precise value of the relay count will, of course, be dependent on the clock source chosen.

As indicated at steps 226, 228, and 236, so long as the relay count stays greater than 0 (step 226), the program decrements the relay count (step 234) and returns to the beginning of the main loop (step 206 ), but leaves the output signal on or in the "blocked" state. Thus, so long as a detector is malfunctioning or indicates blockage, the circuit output will be turned on. Essentially, in either case, the circuit reports an "error" condition. The master controller board will interpret it as an item has vended, and, if the regimen of U.S. Pat. No. 6,772,906 is used by master control board 34, will not try to keep vending until released from that state.

The algorithm of FIG. 5 turns the output line off only if either of the two conditions stops, and then only after it runs through the main loop enough times to decrement the initial relay count value to 0 (zero), i.e., for approximately 150 ms.

But, as can be seen from FIG. 5, the relay count is basically retriggerable. Each time through the main loop, if either of the two conditions are met in steps 210 or 224, the relay count is reset to its maximum value. It is only after both of the conditions have cleared (no detector malfunction is indicated and no detector blockage is sensed), that the algorithm will decrement down to zero.

However, if desired, the software running the algorithm can have a maximum time limit for the output signal. For example, for any vend instruction from master controller board 34, a maximum output signal "on" time (e.g. 300 ms) could be set. The master control board would interpret any output signal from the microprocessor 30 that lasts at least 150 ms as being an indication of an "error" condition (detector malfunction or detector blockage). The software would allow one retriggering of the 150 ms relay count as a redundancy check, and then reset the relay count to 0, ready to sense the next vend. Of course, there does not have to a maximum or it could be set to a different value, as might be desired.

Initialization also includes setting the emitter modulator (step 202). As discussed earlier, the emitters are modulated to approximately 38-40 kHz. Other modulations and methods to do so can be used.

c. Begin Main loop.

What is called the main loop begins (step 204) with microprocessor 30 turning off all emitters D on board 20 (Step 206) for a set period of time, here 250 microseconds (μs) (step 208).

(1) Detector Check.

At the beginning of each iteration of the main loop, the operation of detectors U is checked. Through scanning inputs 80-84, microprocessor 30 checks if all detectors U are off (step 210), i.e., not detecting any relevant IR energy. In other words, it checks to make sure no detector is indicating receipt of IR light energy at the modulated frequency above its triggering threshold, which would indicate a malfunction of that detector because all emitters are off at that time. If any detector U is on at this point, microprocessor 30 generates an output signal at the output stage of detector board 26 (step 212). This is essentially an error signal because the circuitry is not monitoring whether a vended item has dropped, it is testing operation of the detectors.

For example, as indicated at FIG. 5, if any detector U does detect relevant IR energy during the all-emitters-off time period, microprocessor generates the output signal at output 90 which pulls the output 91 low as an indication that something is wrong with the hardware. This function is realized as a failsafe or cautionary procedure. The system assumes there is a problem if a detector U indicates receipt of IR during the time all emitters D are off. This checks the "health" of detector elements U, primarily testing if a detector has failed in an "on" state. Also, it can catch if someone is "spoofing" the vending machine with a remote control IR source. As will become clearer below, without this function, a malfunctioning detector U might indicate it is receiving IR energy from an emitter, when in fact it is not. Essentially, the vend sensor would miss any vended item and would fail to inform master controller board 34 if a product dispenses to the dispensing area, when in fact it has actually been delivered. This is problematic because under the vending regimen of U.S. Pat. No. 6,772,906, master controller board 34 would mistakenly try to dispense. This may result in dispension of a second item, when the customer has already received the item.

It is noted that if either an emitter or detector fails in the "off" state, this will be assumed to be a permanent light being blocked during normal operation which could also be interpreted as grid misalignment. This would cause the output on line 32 to controller board 34 to drop low which would be the desired state for this circumstance. Therefore, no additional processing is needed to monitor that condition.

If the detector check (steps 208, 210) results in a "blocked" or "error" output signal (step 121), microprocessor 30 sets a timer to 150 milliseconds(ms) (step 214) (or, equivalently, sets the relay count), and the program moves to the next step. The 150 ms is the minimum amount of time the output line is activated. In other words, if a detector malfunction occurs only once during the main loop, the output line will be set to "blocked" for 150 ms, and then set to "unblocked". However, as discussed above, the output line will be set to "blocked" as long as the condition of step 212 is met during each loop of the algorithm, and there can be a maximum time, if desired, after which the output is reset to "unblocked".

(2) Emitter Operation.

Regardless of whether all detectors are indicated off and functioning properly in step 210, or whether a malfunction is indicated and the 150 ms timer is set in step 214, microprocessor 30, through its appropriate output 85, 86, 87, 88, or 89, activates a first emitter (in this example emitter D2 of FIG. 3A) for the time period in Table 1 (step 216).

TABLE 1

| Emitter (as shown in FIG. 3A) | Duration |
|---|---|
| D2 | 250 μs maximum |
| D5 | 250 μs |
| D3 | 250 μs maximum |
| D4 | 250 μs |
| D6 | 250 μs |

The control of the order of illumination of the individual emitters ensures that the total amount of light striking each detector is essentially constant over an illumination cycle. An illumination cycle consists of the steps of enabling each emitter in turn with a properly modulated signal. The modulation of the beam allows the received beam to be filtered to reduce sensitivity of the detector to ambient light. The staggering of the "firing order" of the emitters ensures that each detector receives, to some degree, uniform illumination over the course of an illumination cycle.

Variable N is incremented by 1 (step 218) and microprocessor 30 checks if N=5 (step 220). During the first pass through the loop, N is not equal to 5 (i.e., N=1). Therefore, the first emitter is instructed to remain on for 250 microseconds minimum (see Table 1) (step 222). This time, microprocessor 30, via inputs 80-84, checks if all detectors U are on, that is, it checks whether all of the five detectors are receiving at least their threshold level of IR energy from the emitter that is on. Four different conditions can exist at this point in the main loop.

First, if all detectors U passed the detector test of steps 206/298/210 and all the detectors U are on during steps 222/224, indicating each detector "sees" the emitter that is on, microprocessor 30 checks the relay count (step 226). Under this condition, the relay count is 0 (zero). It has not changed from its initialized value. The output line will not be activated (step 236 ). During this first pass through the main loop of FIG. 5, the vend sensor indicates that (a) all detectors appear to functioning correctly, and (b) nothing has blocked any detector. Therefore, the vend sensor does not pass any indication that a vend has occurred to the master controller. Under the regimen of U.S. Pat. No. 6,772,906, if a vend has been authorized, the master controller will wait a while to see if the vend sensor indicates a vend has occurred during the next iteration of the main loop.

Second, if all detectors U passed the detector test of steps 206/208/210 but all the detectors U are not on during steps 222/224, microprocessor 30 turns the output line on (step 232) and sets the timer (the relay count) to the equivalent of the 150 ms period (step234). This creates the indication that at least one detector does not "see" the emitter that is on and makes the assumption it was the result of a vended item blocking that (those) detector(s). Microprocessor 30 then checks the relay count (step 226) and will find it is greater than 0 (zero). During this first pass through the main loop of FIG. 5, and under this second condition, the vend sensor indicates that (a) all detectors appear to functioning correctly, and (b) the selected item has been vended. And, by turning the output line on or active, the vend sensor passes the indication that a vend has occurred to the master controller. Under the regimen of U.S. Pat. No. 6,772,906, the master controller will discontinue any further attempt to vend an item and reset for the next vend instruction. Before, returning to the main loop, the relay count is decremented by the pre-ser amount (step 228).

Third, if any detector U did not pass the detector test of steps 206/208/210, microprocessor 30 still checks whether or not all the detectors U are on during steps 222/224. Assuming, under this third condition, that all detectors are indicated to be on during the period of time emitter D2 is on, microprocessor checks the relay count (step 226). However, under this third condition, the relay count has been set to its 150 ms equivalent at step 212 because of the malfunction of a detector. Therefore, even though all detectors appear to "see" emitter D2 when it is on at step 224, the output line has been turned on for 150 ms at step 212 and the relay count is greater than zero. As a result, the output line will remain activated (it will not be turned off) but the relay count will be decremented (step 228). The master controller does not differentiate between a detector malfunction at steps 210/212 and an indicated blockage at steps 224/232. The regimen of U.S. Pat. No. 6,772.906 simply sees the output line high and discontinues any attempt to continue to vend from that dispensing mechanism, for the reasons discussed previously.

Fourth, if any detector U does not pass the detector test of steps 206/208/210, microprocessor 30 will immediately turn the output line on and set the timer to the 150 ms value (by setting the relay count). Microprocessor 30 still checks whether or not all the detectors U are on during steps 222/224. Assuming, under this fourth condition, that one or more detectors are indicated to be off during the period of time emitter D2 is on, microprocessor leaves the output line on (step 232) and resets (or retriggers) the timer to its 150 ms equivalent. Microprocessor then checks the relay count (step 226). Under this fourth condition, the relay count was been set to its 150 ms at preceding step 212 because of the malfunction of a detector, and again at step 234 because of an indicated blockage of one or more detectors. Therefore, the relay count is greater than zero. As a result, the output line is activated but the relay count will be decremented (step 228). Again, the master controller does not differentiate between a detector malfunction at steps 210/212 and an indicated blockage at steps 224/232. The regimen of U.S. Pat. No. 6,772,906 simply sees the output line active and discontinues any attempt to continue to vend from that dispensing mechanism, for the reasons discussed previously.

At the end of the first iteration of the main loop at either step 228 or 236, the algorithm returns to the start of main loop (step 204). On the second iteration of the main loop, a detector check is again made (as described above and shown at steps 206/208/210). Then, a second emitter (in this example emitter D5, see Table 1) is turned on, N is incremented to N=2 (steps 216/218/220/222), and detectors are checked to see if they "see" the light from emitter D5 (step 224).

As described above, the algorithm again can be in one of the above-described four conditions, except for one major difference. If the output line had been turned on at either or both steps 212 or 232 during the first iteration of the main loop, the output line will already be turned on and the relay count will be greater than zero. Therefore, even if no malfunction or blockages are indicated at steps 210 or 224 during the second main loop iteration, the relay count (step 226) will be greater than zero and the relay count will be decremented (step 228), but the output line will stay on and the algorithm moves to the next iteration of the main loop. If no malfunction or blockages are indicated at steps 210 or 224 for subsequent iterations of the main loop, the output line will remain on until the relay count is decremented to zero, at which time (step 226) the output line will be turned off (step 236). In other words, this embodiment of the algorithm has intentionally designed that once the output line is turned on, it should remain on a minimum of the amount of time it takes main loop the cycle for 150 ms. This provides the master controller with a pulse at least 150 ms long from the vend sensor.

But, on the other hand, if during the second main loop iteration, either a detector malfunction or a detector blockage is sensed, the output line is set to or maintained high, and the timer/relay count is reset to its maximum. Thus, every instance of detector malfunction or detector blockage resets the output signal high for at least the minimum 150 ms time.

But, as mentioned, the algorithm could turn the output line off after a maximum limit of on time. Here that maximum is selected to be 300 ms, because it would tend to indicate a perpetuating error situation if that condition occurs that long a time.

The main loop is then repeated in this fashion for the third, fourth and fifth emitters in the order of Table 1; that is, until N=5 (step 220), which means all five emitters have been sequentially activated with the intervening off times of steps 206 and 208). The algorithm would function similarly during operation of the third, forth, and fifth emitters, and subsequent main loop iterations, and therefore, they will not be described further except as follows.

When N=5, variable N is reset to 0 (step 230), and the main loop starts over with all emitters off, then the first emitter on, then all emitters off, then the second emitter on, and so forth. The predetermined sequence of firing of emitters D of Table 1 is repeated over and over so long as the circuit is powered.

Therefore, the program of FIG. 5 activates each source emitter D individually. Not all emitters D are on simultaneously. The method checks that each emitter D is "seen" by all detectors U on the other side of the vend area 10. The sequence of firing of emitters D is shown in Table 1. Any sequence can be used but, in this embodiment, the sequence and on-times are selected because of the following. The maximum "on time" for any emitter, as indicated in Table 1, is 250 microseconds (0.000250 seconds). During this period, the system checks to see that all detectors U are detecting infrared from the emitter on at that time. After an emitter is turned off, the system waits another 250 microseconds. After this delay, the next emitter D in sequence is turned on and the system checks to see if all detectors U "see" that beam. But, as noted in Table 1, not all emitted beams are treated equally. In order to counter-act glancing reflections off of the inside of the vending machine, which can prevent the emitters and detectors from being properly aligned, the five emitters D are pulsed as indicated in Table 1. In the case of beams from the outside two emitters D2 and D3 of FIG. 3A, the beam is shut off "early" if the detector board 26 indicates all detectors U are detecting the beam. This is to cut down on shallow angle reflectance on the inside of structure defining the dispensing area in the vending machine. When an emitter D is shut down "early", it still will wait 250 microseconds before going on to the next step in the algorithm of FIG. 5.

An example of compensation that could be used with the exemplary embodiment is further described as follows. The software could be programmed to contain compensation for the reflected light received by the two outer detectors. During normal algorithm operation, stray light from the emitters often reflects from surfaces inside the machine onto the detectors. The two outer detectors, because of their placement, receive more reflected light than the inner detectors. The stray light pickup by the outer detectors affects them by decreasing their overall sensitivity to the light generated by the emitters. This is due to the presence of the AGC circuit in each detector that reduces the sensitivity of the detector in proportion to the amount of light received. The sensitivity decrease causes a problem with detecting the lower light intensity at the outermost detector at one end of the detector board when the outermost emitter at the opposite end of the emitter board is energized. The problem can manifest itself as a false beam-blockage detection.

A solution for this problem is to compensate for the effect of the reflected beams by shortening the total time the outside emitters are on to the minimum needed to generate the correct unblocked condition in all detectors. This is implemented by reducing the amount of time the outer two emitters are on (see Table 1) to minimum amount needed for normal operation of the light curtain. An illumination cycle is divided into five equal time periods. Each time period is associated with the illumination of one of the emitters. An emitter occupying an inner position (any of the three positions between outermost emitters) of the emitter board or module 20 is enabled for a fixed time occupying most of its time period during an illumination cycle. An emitter occupying one of the outer positions is enabled only until all detectors detected the signal. Then it is disabled for the remainder of that emitter's time period. The reduced amount of time the outer emitters are enabled reduces the total amount of light reaching the outer detectors. This prevents the occurrence of the reduced-sensitivity caused false-blockage problem of the light curtain.

Ambient light interference compensation can include hardware, using filtered infrared light, modulating the emitter beams with an approximately 40 kilohertz signal. Alternatively, intelligent programming and/or possibly adjusting the beam numbers/spacing can be considered. Prevention of "false" product delivery sensing might be deterred by painting the inside of the vending chassis next to the delivery sensor. Paint with stronger texture seems to help prevent false senses.

In this embodiment, five sensors with 250 μs off time and 250 μs on time (500 μs total for each loop) generate 2000 iterations of the algorithm per second. It would take approximately 2500 μs to sequence through on/off of each of the five emitters. In comparison, if the algorithm turns the output line "on" for the time of 150 ms (150,000 μs), the output line will be held "on" for a minimum of 60 scans by the set of five emitters (150,000 divided by 500=300 divided by 5=60). Since the process loops or repeats, that output may remain closed longer than this period as the object passes through the beams. The 150 milliseconds is the minimum duration in this embodiment. The output is basically retriggerable anytime the conditions shown in steps 212 or 232 exist.

The detection field consists of the array of infrared light beams from emitters D. The infrared detectors U are intended to detect when a product falls through the detection field and interrupts at least one of the light beams. If the main controller board 34 attempts to dispense an item, and the delivery sensor system does not detect it falling through its detection field, then the absence of a signal from the delivery sensor will show that the item failed to vend. When this happens, the master controller will make a second attempt to vend the item. Thus, the algorithm in co-pending U.S. Pat. No. 6,772,906 kicks in.

The goal is to make the system resistant to a tolerable level of ambient light, e.g. illumination levels approximating direct sunlight. The light intensity value of direct sunlight is approximately 127,000 lux. The design goal for maximum tolerable ambient light is 60,000 lux.

This embodiment is designed to detect rectangular products as small as 1.912 by 3.029 by 0.028 inches in diameter and circular objects as small as 0.338 inches in diameter. Detection goals for the two shapes are in ideal conditions.

However, the system is not fool proof. As stated, there are "blind areas" or "dead zones." Certain regions within the grid may not detect products.

For example, with this methodology, each of the five emitters is turned on separately in a sequence with a space of time in between. As diagrammatically illustrated in FIG. 2A, when emitter D2 is on, although it is somewhat directional, it spreads in a manner that can be detected by each detector U if properly aligned (see beam spread indicated at angle 47). However, during that time period, certain parts of the vend area 10 are not detected. In other words, a limited number of detectors U, being spaced apart, are looking only for IR energy from a single emitter D. Because light travels in a straight line, at least areas indicated at reference numerals 41 and 42 are not covered by any detecting ability of detectors U. Detectors U are essentially blind to those areas (compare difference of angle 47 to angle 48). Additionally, areas such as 43, 44, 45, and 46 may not be covered because each hole has a "viewing angle "similar to the emitters.

FIG. 2B illustrates the method when emitter D5 (the middle emitter) is activated. Alignment of board 24 and 26 is such that each detector U sees IR energy from emitter D5 when it is on. However, blind areas 41-46 still exist.

Similar blind areas exist when emitters D3, D4, and D6 are on. However, some of the "blind spots" change for each emitter.

By further example, turning all emitters off for a period of time leaves the system intermittently "blind". Selection of the off time for all emitters was made with the following considerations. A complete "cycle" through the five emitters occurs once every 0.0005 seconds, or 2000 times per second. By rough calculation, an object that is, say, 3" long would take about 0.013 seconds to pass the sensors, or about 36 complete sensor scans. This estimate is derived by calculating the time gravity would accelerate such an object approximately six feet, which is most times the maximum drop distance for a vended product from a snack vending machine.

As can be appreciated, however, by cycling sequentially through emitters D in the short time duration indicated, the system attempts to cumulatively provide somewhat of an approximation of a "light curtain" between emitters D and detectors U. While not all emitters D are on at the same time, and there are blind spots for the system, balancing cost, complexity and other factors, this system provides what is considered a reasonable coverage of the vend area or reasonable confirmation of vend. The scanning of the dispensing area by sequential operation of the emitters is believed to be a practical way to optimize light beam break detection with a minimum number of emitters and detectors, even if not all areas are covered.

D. Options and Alternatives

It will be appreciated that the invention can take a variety of forms and embodiments. The exemplary embodiment described above is made not by way of limitation to the invention, but for illustration of but one form the invention can take. Variations obvious to those skilled in the art are included within the invention, which is described solely by the claims appended hereto.

For example, the invention is not limited to five emitters and five detectors. However, it is preferred that the number be minimized and that there be spacing between emitters and between detectors.

The types of components and their operational states can vary. For example, in the exemplary embodiment, the emitters are considered active when off and the detectors are considered active when on. Timers and counters can vary depending on the reference used (e.g. the external crystal or on-board oscillator).

The specific algorithm for operation can vary. For example, emitter on and off times can be changed through programming.

The memory technology can include a feature of disabling the ability to extract the code from the memory device.

Environmental design considerations include temperature ranges, vibration, shock, ESD, EM resistance, and others such as are well known in the art. Goals are as follows: operating and storage temperature of −30 degree Fahrenheit to 185 degree Fahrenheit, operation under relative humidity of 20-90% non-condensing.

To address "dead zones" or "blind spots", options could include specialized code intended to exploit the large dimensions of objects such as cards having less than $1/16^{th}$ inch thickness, in the non-thickness direction. Alternatively, adaptive detection that would use more than just basic data in making a detection determination.

APPENDIX 1

Emitter Board 20

| Qty/ PCB | Device | Value | Unit | Tol | Volts/ Watts | Package | Manufacturer | MFG Part Number | Description | Ref Designator |
|---|---|---|---|---|---|---|---|---|---|---|
| 2 | Capacitor, Aluminum, SMT, B Size | 47 | uF | 0.2 | 6.3 V | | Panasonic | ECE-V0JA470WR | Capacitor, Aluminum | C1, C2 |
| 1 | Resistor, 0603 | 4.7 | ohm | 0.05 | 1/16 W | 603 | Panasonic | ERJ-3GSYJ4R7V | Resistor, 0603 | R13 |
| 5 | Resistor, 0603 | 22 | ohm | 0.05 | 1/16 W | 603 | Panasonic | ERJ-3GSYJ220V | Resistor, 0603 | R15, R22, R23, R24, R25 |
| 5 | Infrared Diode | IR LED | | | | 1206 | Kingbright | AP3216P3C | Infrared Diode | D1, D7, D8, D9, D10 |
| 1 | Circuit Board | 1" * 6" | | | | | Career | PCBFAWEMI1.1 | Circuit Board, Double Sided 0.063", FR4 | |
| 1 | Header | 7-pin header | | | | | FCI | 55101-xxx7 | 7 Contact, 0.1" RA header | J2 |
| | | | | | | Or | Molex | 22-28-8070 | | |

APPENDIX 1-continued

Emitter Board 20

| Qty/ PCB | Device | Value | Unit | Tol | Volts/ Watts | Package | Manufacturer | MFG Part Number | Description | Ref Designator |
|---|---|---|---|---|---|---|---|---|---|---|
| | | | | | Unpopulated | | | | | |
| 5 | Infrared Diode, SMT, 1206 size | IR LED | | | | TH | Lumex | OED-EL1206C140 | Infrared Diode | D2, D3, D4, D5, D6 |
| 1 | Wire Tie | | | | | | | | 3" ⅜" by .08" wide Wire Tie | |

APPENDIX 2

Detector Board 26

| Qty/ PCB | Device | Value | Unit | Tol | Volts/ Watts | Package | Manu-facturer | MFG Part Number | Description | Ref Designator |
|---|---|---|---|---|---|---|---|---|---|---|
| 6 | Capacitor, Ceramic | 0.1 | uF | 10% | 16 V | 603 | Panasonic | ECJ-1VB1C104K | Capacitor, Ceramic | BP2, BP3, BP4, BP5, BP8, BPU1P2 |
| 2 | Capacitor, Aluminum | 47 | uF | 20% | 6.3 V | CAP\ECE-VS_SIZE_C | Panasonic | ECE-V0JA470WR | Capacitor, Aluminum | C1, C7 |
| 1 | Capacitor, Aluminum | 33 | uF | 20% | 10 V | CAP\ECE-VS_SIZE_C | Panasonic | ECE-V1AA330WR | Capacitor, Aluminum | C8 |
| 1 | Capacitor, Aluminum | 10 | uF | 20% | 35 V | CAP\ECE-VS_SIZE_D | Panasonic | ECE-V1VA100WR | Capacitor, Aluminum | C6 |
| 1 | LED, RED | | | | | 1206 | Lumex | SML-LX1206IW-TR | LED, RED | D2 |
| 1 | Transistor, NPN, SOT-23 | MMBT2222ALT1 | | | | SOT23 | On Semi | MMBT2222ALT1 | Transistor, NPN, SOT-23 | Q6 |
| 2 | Transistor, NPN, SOT-23 | MMBTA06 | | | | SOT23 | Diodes, Inc | MMBTA06 | Transistor, NPN, SOT-23 | Q8, Q9 |
| 10 | Resistor, 0603 | 10K | ohm | 0.05 | 1/16 W | 603 | Panasonic | ERJ-3GSYJ103V | Resistor, 0603 | R1, R10, R26, R28, R29, R30, R31, R32, R33, R35 |
| 8 | Resistor, 1206 | 1000 | ohm | 0.05 | 1/8 W | 1206 | Panasonic | ERJ-8GEYJ102 | Resistor, 1206 | R2, R3, R4, R5, R6, R9, R11, R27 |
| 5 | Resistor, 0603 | 22 | ohm | 0.05 | 1/16 W | 603 | Panasonic | ERJ-3GSYJ220V | Resistor, 0603 | R15, R22, R23, R24, R25 |
| 2 | Resistor, 0603 | 100 | ohm | 0.05 | 1/16 W | 603 | Panasonic | ERJ-3GSYJ101V | Resistor, 0603 | R7, R34 |
| 1 | Resistor | 0 | ohm | 5% | 1/16 W | 0603 | Panasonic | ERJ-3GSYJ000V | 0 Ohm Resistor | R12 |
| 1 | CPU | MSP430F1121 | | | | SMT | Ti | MSP430F1121PW | CPU | U1 |
| 5 | Optical Detector | | | | | TH | Lumex | OED-MRM791-2F | Optical Detector | U2, U3, U4, U5, U8 |
| 1 | LM1086IS | | | | | TO263\3 smt | National | LM1086IS-5.0 | LM1086IS | U6 |
| 1 | LM1086IS | | | | | TO263\3 smt | National | LM1086IS-3.3 | LM1086IS | U7 |
| 1 | LM809 | | | | | SOT23 | National | LM809M3-2.93 | LM809 Reset Device | U9 |
| 1 | MOV Device | Series 7, Type D | | | 68 WVDC | TH | Panasonic | ERZ-V07D680 | MOV Device | Z1 |
| 1 | Crystal | 8.00 MHz | | | | SMT | Panasonic | EFO-S8004E5 | Crystal | Y1 |
| 1 | Circuit Board | 1" * 6" | | | | | Career | PCBFAWDET1.1 | Circuit Board, Double Sided FR4 | |
| 1 | Header | 7-pin header | | | | | FCI | 55101-xxx7 | 7 Contact, 0.1" RA header | J2 |
| | | | | | | Or | Molex | 22-28-8070 | | |
| 1 | Cable | 98" | | | | | General Cable | C4064-12-10 | 5 Conductor 22 AWG, CPU Cable | |

APPENDIX 2-continued

Detector Board 26

| Qty/ PCB | Device | Value | Unit | Tol | Volts/ Watts | Package | Manu-facturer | MFG Part Number | Description | Ref Designator |
|---|---|---|---|---|---|---|---|---|---|---|
| 1 | Housing | | | | | | Molex | 09-50-8150 | .156 Pitch 15 Pin CPU Cable Housing | |
| | | | | | | Or | Amp | 1-640251-5 | | |
| 4 | Contacts | | | | | | Molex | 08-50-0134 | 4 Contacts for the CPU Cable | |
| | | | | | | Or | Amp | 350980-1 | | |
| 2 | Plugs | | | | | | Molex | 15-04-0297 | Polarity Plugs for CPU Cable Header | |
| | | | | | | Or | Amp | 640254-1 | | |
| 1 | Wire Tie | | | | | | | | 3" 3/8" by .08" wide Wire Tie | |
| | | | | | | Unpopulated: | | | | |
| 2 | Capacitor, Ceramic | 22 pF | pF | 0.05 | 50 V | 603 | Panasonic | ECJ-1VC1H220J | Capacitor, Ceramic | C3, C4 |
| 1 | Capacitor, Aluminum | 47 | uF | 20% | 6.3 V | CAP\ECE-VS_SIZE_C | Panasonic | ECE-V0JA470WR | Capacitor, Aluminum | C2 |
| 1 | Capacitor, Aluminum | 10 UF | uF | 20% | 16 V | CAP\ECE-VS_SIZE_B | Panasonic | ECEV1CA100SR | Capacitor, Aluminum | C5 |
| 1 | Diode | DL4148 | | | | MLL34 | Diodes Inc. | DL4148 | Diode | D1 |
| 1 | Transistor, PNP, SOT-23 | MMBT2907 | | | | SOT23 | On Semi | MMBT2907A | Transistor, PNP, SOT-23 | Q5 |
| 1 | Resistor, 0603 | 4.7 | ohm | 0.05 | 1/16 W | 603 | Panasonic | ERJ-3GSYJ4R7V | Resistor, 0603 | R13 |
| 1 | Resistor | 0 | ohm | 5% | 1/16 W | 0603 | Panasonic | ERJ-3GSYJ000V | 0 Ohm Resistor | R8 |
| 1 | Resistor, 1206 | 1000 | ohm | 0.05 | 1/8 W | 1206 | Panasonic | ERJ-8GEYJ102 | Resistor, 1206 | R14 |
| 1 | Wire Tie | | | | | | | | 3" 3/8" by .08" wide Wire Tie | |
| 3 | 2 pin Header | | | | | | | | 2-pin Header (Jumper) | JP1, JP2, JP3 |
| 1 | 2 × 7 pin Header | | | | | | | | Debug/ Programming Header | J3 |

APPENDIX 3

Interconnect Cable 28

| Qty/ PCB | Device | Value | Unit | Tol | Volts/ Watts | Package | Manufacturer | MFG Part Number | Description | Ref Designator |
|---|---|---|---|---|---|---|---|---|---|---|
| 2 | Housing | | | | | | Molex | 22-01-2071 | Housing, 7 pin | |
| 14 | Contacts | | | | | | Molex | 08-50-0113 | Contacts | |
| 1 | Cable | | | | | | General Cable | | 58", 22 AWG, 7 Cond. Cable | |

What is claimed is:

1. A method of providing reasonable assurance of a completed vend of a vendible item in a vending machine comprising:

a. placing a set of optical emitters at spaced apart locations on one side of a dispensing area of the vending machine, the emitters each having on and off states, and when in the on state, emitting optical energy of predetermined characteristics, and an emitter beam spread;

b. placing a set of optical detectors at spaced apart locations on a generally opposite side of the dispensing area in the emitter beam spread for each emitter of the set, each detector having on and off states, the on state adapted for sensing of at least a threshold level of optical energy of said predetermined characteristics from a detector viewing angle including each emitter of the set;

c. holding all the emitters in the off state for a time period, monitoring the state of all the detectors and if any detector indicates an on state generating an output signal to indicate a possible error condition;

d. turning an emitter on for a time period, monitoring the state of all the detectors and if any detector does not indicate an on state, generating an output signal to indicate a completed vend;

e. repeating steps c. and d. for each other emitter;

f. communicating any output signal to a master controller of the vending machine.

2. The method of claim 1 wherein the emitters emit infrared energy.

3. The method of claim 2 wherein the emitters are LEDs.

4. The method of claim 3 wherein the LEDs' output is modulated to a frequency range.

5. The method of claim 4 wherein the detectors are adapted to detect IR energy in the frequency range.

6. The method of claim 1 wherein there are five emitters.

7. The method of claim 6 wherein there are five detectors.

8. The method of claim 1 wherein the emitters are spaced approximately an inch apart.

9. The method of claim 8 wherein the detectors are spaced approximately an inch apart.

10. The method of claim 1 wherein the emitters are spaced apart from the detectors at least approximately ten inches and no more than approximately three feet.

11. The method of claim 1 wherein the output signal is used to control a vending regimen by the vending machine.

12. The method of claim 1 wherein the sequence the emitters of the set are turned on is other than in seriatim.

13. The method of claim 1 further comprising repeating steps c., d., and e. after each of the emitters of the set has been turned on.

14. The method of claim 1 wherein an emitter is turned on for a different period of time than another emitter.

15. The method of claim 14 wherein the said emitter which is turned on a different period of time is an end-most emitter of the set of emitters.

16. The method of claim 1 wherein the output signal is retriggerable in steps c. or d.

17. The method of claim 1 wherein the time to cycle through steps c., d., and e. is designed to be less than estimated time for a vendible item to drop between the emitters and detectors in free fall.

18. An apparatus to provide reasonable assurance of completion of a vend of a vendible item from a vending machine, comprising:

a. a first support member upon which is mounted a set of optical emitters in spaced apart locations, each emitter having a beam spread;

b. a second support member upon which is mounted a set of optical detectors in spaced apart locations, each detector being positioned in the beam spread of all emitters and having a viewing angle including all emitters of the set;

c. a controller operatively connected to each emitter and detector, the controller programmed to:

i. control on and off of individual emitters for a period of time in a predetermined sequence, separated by a period of time all the emitters are off;

ii. monitor a triggering threshold of all the detectors during the time all the emitters are off, the triggering threshold adapted to sense at least a certain level of optical energy of the type emitted by the emitters;

iii. generate an output signal if:

1. any detector triggers during any period all the emitters are off to indicate a possible error condition; or 2. any detector does not trigger during any period an emitter is on to indicate a completed vend;

d. an interface adapted for communication of the output signal to a master controller board of a vending machine.

19. The apparatus of claim 18 wherein the first and second support members comprise a circuit board.

20. The apparatus of claim 18 wherein the first and second support members have perimeter dimensions that do not exceed approximately several inches by one-half of foot.

21. The apparatus of claim 18 wherein there are five emitters.

22. The apparatus of claim 18 wherein there are five detectors.

23. The apparatus of claim 18 wherein the emitters are spaced from one another approximately one inch.

24. The apparatus of claim 23 wherein the detectors are spaced from one another approximately one inch.

25. The apparatus of claim 18 wherein the controller is a microprocessor.

26. The apparatus of claim 18 wherein the output signal is communicated to a interface to a master controller board of a vending machine.

27. The apparatus of claim 18 in combination with a vending machine.

28. A method of optically monitoring for a vend of a vendible product in a vending machine comprising:

a. spacing out several emitters on one side of a vend area of the vending machine, the emitters adapted to emit electromagnetic energy of a restricted beam width and predetermined wavelength, each emitter having a beam spread;

b. spacing out several optical detectors on another side of the vend area, the optical detectors adapted to turn on when receiving electromagnetic energy of the predetermined wavelength over a threshold value, each detector being positioned in the beam spread of all emitters of the set and having a viewing angle including all emitters of the set;

c. upon a vend instruction to the vending machine, monitoring for a vend by an algorithm adapted to:

i. turn on the emitters in a predetermined sequence for predetermined time periods separated by all the emitters turned off for a predetermined time period;

ii. check if all the detectors are on during the time periods any emitter is on;

d. if any detector does not turn on during the time period any emitter is on, generating a signal to the vending machine indicative that a vend has occurred;

e. if any detector turns on during the time all the emitters are off, generating a signal to the vending machine indicative of a possible error.

29. The method of claim 28 wherein the signal comprises a pulse of an output line.

30. The method of claim 28 further comprising instigating a vend correction regimen if no signal is sent to the vending machine during an instructed vend cycle.

31. The method of claim 28 further comprising conducting a test of detector operation before each emitter is turned on.

32. The method of claim 28 further comprising generating a signal if any detector is on during the time all emitters are off.

33. The method of claim 28 further comprising repeating step c for each emitter in a predetermined sequence.

34. The method of claim 28 further comprising generating the output signal for a time period.

35. The method of claim 34 wherein the time period for generating the output signal is longer than the time to turn on and off all emitters one time.

36. The method of claim 28 further comprising five emitters and five detectors, the emitters spaced apart from each other in generally a row, the detectors spaced apart from each other in generally a row, and the emitters and detectors are spaced from each other across a dispensing area generally in alignment.

37. The method of claim 28 further comprising communicating the signal to a master controller board of a vending machine.

38. An apparatus for optically monitoring optically monitoring for a vend of a vendible product in a vending machine comprising:

a. a set of several emitters spaced apart on one side of a vend area of the vending machine, the emitters adapted to emit electromagnetic energy of a restricted beam width and predetermined wavelength, each emitter having a beam spread;

b. a set of several optical detectors spaced apart on another side of the vend area, the optical detectors adapted to turn on when receiving electromagnetic energy of the predetermined wavelength over a threshold value, each detector being positioned in the beam spread of all emitters of the set and having a viewing angle including all emitters of the set;

c. a microprocessor operatively connected to each emitter and detector and having a program which, upon a vend instruction to the vending machine, monitoring for a vend by an algorithm adapted to:

i. turn on the emitters in a predetermined sequence for predetermined time periods separated by all the emitters turned off for a predetermined time period;

ii. check if all the detectors are on during the time periods any emitter is on;

iii. if any detector does not turn on during the time period any emitter is on, generating a signal to the vending machine indicative that a vend has occurred;

iv. if any detector turns on during the time all the emitters are off, generating a signal to the vending machine indicative of a possible error.

39. The apparatus of claim 38 further comprising a timer to time on and off of the emitters.

40. The apparatus of claim 38 further comprising a timer to time the length of time of the generated signal.

41. The apparatus of claim 38 further comprising a modulator to modulate the electromagnetic energy of the emitters.

42. The apparatus of claim 38 wherein the signal is adapted for communication to a vending machine.

43. The apparatus of claim 38 wherein the signal is adapted for communication to a master controller board of a vending machine.

44. The apparatus of claim 38 wherein the signal turns a transistor on or off.

45. The apparatus of claim 38 wherein the signal operates a relay.

46. The apparatus of claim 38 in combination with a vending machine.

47. The apparatus of claim 46 wherein the vending machine is a snack vending machine with multiple rows and columns of dispensing mechanisms.

48. A system for optically monitoring optically monitoring for a vend of a vendible product in a vending machine comprising:

a. a dispensing area in the vending machine;

b. a master controller controlling dispension of vendible products in the vending machine;

c. a set of several emitters spaced apart on one side of the vend area of the vending machine, the emitters adapted to emit electromagnetic energy of a restricted beam width and predetermined wavelength, each emitter having a beam spread;

d. a set of several optical detectors spaced apart on another side of the vend area, the optical detectors adapted to turn on when receiving electromagnetic energy of the predetermined wavelength over a threshold value, each detector being positioned in the beam spread of all emitters of the set and having a viewing angle including all emitters of the set;

e. a microprocessor operatively connected to each emitter and detector and having a program which, upon a vend instruction to the vending machine monitoring for a vend by beginning a algorithm adapted to:

i. turn on the emitters in a predetermined sequence for predetermined time periods separated by all the emitters turned off for a predetermined time period;

ii. check if all the detectors are on during the time periods any emitter is on;

iii. if any detector does not turn on during the time period any emitter is on, generating a signal to the vending machine indicative that a vend has occurred;

iv. if any detector turns on during the time all the emitters are off, generating a signal to the vending machine indicative of a possible error.

49. The system of claim 48 wherein the algorithm further comprises an initialization of on and off times for the emitters.

50. The system of claim 48 wherein the algorithm further comprises an initialization of on time for the generated signal.

* * * * *

UNITED STATES PATENT AND TRADEMARK OFFICE

CERTIFICATE OF CORRECTION

PATENT NO. : 7,565,222 B2
APPLICATION NO. : 10/758157
DATED : July 21, 2009
INVENTOR(S) : James F. Popelka It is certified that error appears in the above-identified patent and that said Letters Patent is hereby corrected as shown below:

Col. 25, Claim 38, Lines 10-11:
Delete after for optically monitoring "optically monitoring"

Col. 26, Claim 48, Line 10:
Delete after for optically monitoring "optically monitoring"

Signed and Sealed this

Seventeenth Day of November, 2009

David J. Kappos

David J. Kappos
*Director of the United States Patent and Trademark Office*